(12) United States Patent
Crall et al.

(10) Patent No.: US 11,814,174 B2
(45) Date of Patent: Nov. 14, 2023

(54) LAYERED FUSELAGE SHIELD

(71) Applicant: General Electric Company, Schenectady, NY (US)

(72) Inventors: David William Crall, Loveland, OH (US); Nicholas Joseph Kray, Mason, OH (US); Douglas Duane Ward, West Chester, OH (US); Brandon Wayne Miller, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 604 days.

(21) Appl. No.: 17/071,379

(22) Filed: Oct. 15, 2020

(65) Prior Publication Data
US 2021/0339867 A1 Nov. 4, 2021

Related U.S. Application Data

(60) Provisional application No. 62/915,364, filed on Oct. 15, 2019.

(51) Int. Cl.
*F01D 9/04* (2006.01)
*F01D 5/30* (2006.01)
(Continued)

(52) U.S. Cl.
CPC .............. *B64D 45/00* (2013.01); *B32B 7/022* (2019.01); *B64C 1/38* (2013.01); *F01D 5/146* (2013.01);
(Continued)

(58) Field of Classification Search
CPC ........ F01D 9/041; F01D 5/3007; F01D 5/146; F01D 5/30; F01D 5/187; F01D 7/00; F01D 15/10; F01D 15/12; F02K 5/00; F02K 3/06; F02C 6/206; F02C 6/20; F02C 9/00; F02C 9/22; F02C 7/264; F02C 7/32; F02C 7/36; F02C 3/113; B32B 7/022; B32B 2605/18; B32B 2307/558; B32B 2307/72; B32B 2307/732; B32B 2571/02; B64C 1/38;
(Continued)

(56) References Cited

U.S. PATENT DOCUMENTS

| 4,534,526 A | 8/1985 | Metzger et al. |
| 4,917,336 A | 4/1990 | Jacobs et al. |

(Continued)

OTHER PUBLICATIONS

Carney et al., Weight Assessment for Fuselage Shielding on Aircraft With Open-Rotor Engines and Composite Blade Loss, NASA/TM-2013-216582, 2013, 33 Pages.
(Continued)

*Primary Examiner* — Igor Kershteyn
(74) *Attorney, Agent, or Firm* — Dority & Manning, P.A.

(57) ABSTRACT

An aircraft defining a longitudinal direction and a lateral direction is provided. The aircraft includes: a fuselage; an engine mounted at a location spaced from the fuselage of the aircraft, the engine comprising a plurality of rotor blades; and a fuselage shield attached to or formed integrally with the fuselage at a location in alignment with the plurality of rotor blades along the lateral direction, the fuselage shield comprising a first layer defining a first density and a second layer defining a second density, the first density being different than the second density.

21 Claims, 10 Drawing Sheets

(51) Int. Cl.

| | |
|---|---|
| *F01D 5/14* | (2006.01) |
| *F01D 5/18* | (2006.01) |
| *F01D 7/00* | (2006.01) |
| *F01D 15/10* | (2006.01) |
| *F01D 15/12* | (2006.01) |
| *F02K 5/00* | (2006.01) |
| *F02K 3/06* | (2006.01) |
| *F02C 6/20* | (2006.01) |
| *F02C 9/00* | (2006.01) |
| *F02C 9/22* | (2006.01) |
| *F02C 7/26* | (2006.01) |
| *F02C 7/32* | (2006.01) |
| *F02C 7/36* | (2006.01) |
| *F02C 3/113* | (2006.01) |
| *B32B 7/022* | (2019.01) |
| *B64C 1/38* | (2006.01) |
| *B64D 45/00* | (2006.01) |
| *F01D 17/16* | (2006.01) |
| *F01D 25/12* | (2006.01) |
| *F02C 7/264* | (2006.01) |
| *F02K 1/66* | (2006.01) |
| *F02K 1/76* | (2006.01) |

(52) U.S. Cl.
CPC ............ *F01D 5/187* (2013.01); *F01D 5/30* (2013.01); *F01D 5/3007* (2013.01); *F01D 7/00* (2013.01); *F01D 9/041* (2013.01); *F01D 15/10* (2013.01); *F01D 15/12* (2013.01); *F01D 17/162* (2013.01); *F01D 25/12* (2013.01); *F02C 6/206* (2013.01); *F02C 7/264* (2013.01); *F02C 7/32* (2013.01); *F02C 7/36* (2013.01); *F02C 9/00* (2013.01); *F02C 9/22* (2013.01); *F02K 1/66* (2013.01); *F02K 1/76* (2013.01); *B32B 2307/558* (2013.01); *B32B 2307/72* (2013.01); *B32B 2307/732* (2013.01); *B32B 2571/02* (2013.01); *B32B 2605/18* (2013.01); *F02C 3/113* (2013.01); *F05D 2220/323* (2013.01); *F05D 2220/325* (2013.01); *F05D 2230/60* (2013.01); *F05D 2240/12* (2013.01); *F05D 2240/24* (2013.01); *F05D 2240/60* (2013.01); *F05D 2250/37* (2013.01); *F05D 2260/201* (2013.01); *F05D 2260/30* (2013.01); *F05D 2260/4031* (2013.01); *F05D 2260/70* (2013.01); *F05D 2270/05* (2013.01); *F05D 2270/051* (2013.01); *F05D 2270/121* (2013.01); *F05D 2270/304* (2013.01); *F05D 2270/71* (2013.01); *F05D 2270/81* (2013.01)

(58) Field of Classification Search
CPC ............ B64D 45/00; F05D 2220/323; F05D 2220/76; F05D 2260/201; F05D 2240/12; F05D 2240/60; F05D 2260/70; F05D 2260/4023; F05D 2260/30; F05D 2260/4031; F05D 2250/37; F05D 2240/24; F05D 2270/05; F05D 2270/121; F05D 2270/051; F05D 2270/76; F05D 2270/304; F05D 2270/61

See application file for complete search history.

(56) References Cited

U.S. PATENT DOCUMENTS

| | | | |
|---|---|---|---|
| 4,934,825 A | 6/1990 | Martin | |
| 4,976,102 A | 12/1990 | Taylor | |
| 5,148,402 A | 9/1992 | Magliozzi et al. | |
| 5,156,353 A | 10/1992 | Gliebe et al. | |
| 5,190,441 A | 3/1993 | Murphy et al. | |
| 5,197,855 A | 3/1993 | Magliozzi et al. | |
| 5,789,678 A | 8/1998 | Pla | |
| 6,341,747 B1 | 1/2002 | Schmidt et al. | |
| 7,578,132 B2 | 8/2009 | Webster | |
| 8,011,613 B2 | 9/2011 | Belleville | |
| 8,083,482 B2 | 12/2011 | Serven et al. | |
| 8,087,607 B2 | 1/2012 | Moore et al. | |
| 8,186,617 B2 | 5/2012 | Llamas Sandin | |
| 8,196,860 B2 | 6/2012 | Gall et al. | |
| 8,210,798 B2 | 7/2012 | Stern | |
| 8,220,586 B2 | 7/2012 | Todorovic | |
| 8,240,609 B2 | 8/2012 | Parazzoli et al. | |
| 8,350,398 B2 | 1/2013 | Butt | |
| 8,550,397 B2 | 10/2013 | Verde Preckler et al. | |
| 8,678,314 B2* | 3/2014 | Martino Gonzalez | B64C 1/0685 244/119 |
| 8,690,106 B1 | 4/2014 | Reissig | |
| 8,967,967 B2 | 3/2015 | Stretton et al. | |
| 9,057,329 B2 | 6/2015 | Weir et al. | |
| 9,102,397 B2 | 8/2015 | Wood | |
| 9,527,578 B2 | 12/2016 | Towkan | |
| 9,540,094 B2 | 1/2017 | Negulescu et al. | |
| 9,725,155 B2* | 8/2017 | Miller | B64D 27/12 |
| 9,745,051 B2 | 8/2017 | Tantot et al. | |
| 9,758,254 B2 | 9/2017 | Moore et al. | |
| 9,856,745 B2 | 1/2018 | Ali | |
| 9,890,657 B2 | 2/2018 | Ali | |
| 10,118,710 B2 | 11/2018 | Derrez et al. | |
| 10,131,441 B2 | 11/2018 | Edwards et al. | |
| 10,202,865 B2 | 2/2019 | Breeze-Stringfellow et al. | |
| 10,370,086 B2 | 8/2019 | Vion et al. | |
| 10,378,452 B1 | 8/2019 | Barmichev et al. | |
| 10,399,664 B2 | 9/2019 | Bowden et al. | |
| 10,414,486 B2 | 9/2019 | Wood et al. | |
| 10,414,497 B2 | 9/2019 | Velez De Mendizabal Alonso et al. | |
| 10,669,881 B2 | 6/2020 | Breeze-Stringfellow et al. | |
| 2008/0245925 A1 | 10/2008 | Udall | |
| 2009/0045287 A1* | 2/2009 | Belleville | B64D 27/14 244/129.1 |
| 2009/0152400 A1* | 6/2009 | Verde Preckler | B64D 27/14 244/133 |
| 2012/0195739 A1 | 8/2012 | Kingan | |
| 2013/0115083 A1 | 5/2013 | Vuillemin | |
| 2014/0248116 A1 | 9/2014 | Ali | |
| 2014/0374566 A1* | 12/2014 | Fernando | B64C 21/10 248/554 |
| 2015/0291276 A1 | 10/2015 | Zatorski et al. | |
| 2015/0344127 A1 | 12/2015 | Wood et al. | |
| 2016/0010487 A1 | 1/2016 | Breeze-Stringfellow et al. | |
| 2016/0333729 A1 | 11/2016 | Miller et al. | |
| 2016/0333734 A1 | 11/2016 | Bowden et al. | |
| 2016/0368592 A1 | 12/2016 | Szymandera | |
| 2017/0002688 A1 | 1/2017 | Beutin et al. | |
| 2017/0159571 A1 | 6/2017 | Sidelkovskiy | |
| 2017/0225773 A1 | 8/2017 | Wood et al. | |
| 2018/0065727 A1 | 3/2018 | Gruber et al. | |
| 2018/0079492 A1 | 3/2018 | Seidel et al. | |
| 2018/0127084 A1 | 5/2018 | Tajan et al. | |
| 2018/0354634 A1 | 12/2018 | Jodet et al. | |
| 2021/0221491 A1* | 7/2021 | Crall | F02C 7/36 |
| 2021/0339846 A1* | 11/2021 | Crall | F01D 5/146 |

OTHER PUBLICATIONS

Gazzaniga et al., Wind Tunnel Performance Results of Swirl Recovery Vanes as Tested with an Advanced High-Speed Propeller, AIAA-92-3770, 28th Joint Propulsion Conference Exhibit, Nashville TN, Jul. 6-8, 1992, 42 Pages.

Open Rotor Engine and Installation, European Aviation Safety Agency, Notice of Proposed Amendment 2015-22, RMT.0384 Dec. 21, 2015., 96 Pages.

* cited by examiner under 35 U.S.C. § 119(e) to U.S.

LAYERED FUSELAGE SHIELD

CROSS-REFERENCE TO RELATED APPLICATIONS

This application is a non-provisional application claiming the benefit of priority under 35 U.S.C. § 119(e) to U.S. Provisional Application No. 62/915,364, filed Oct. 15, 2019, which is hereby incorporated by reference in its entirety.

FIELD

This application is generally directed to armor for a fuselage of an aircraft and an aircraft including the same.

BACKGROUND

Traditionally, gas turbine engines used in aircraft, e.g., a turboprop, unducted or ducted fan, generally include a turbomachine and a rotor assembly, along with a nacelle surrounding the rotor assembly (which may also be referred to as a fan assembly). The turbomachine generally includes a high-pressure spool and a low speed spool. A combustion section receives pressurized air, which is mixed with fuel and combusted within a combustion chamber to generate combustion gases. The combustion gases are provided first to a high-pressure turbine of the high-pressure spool, driving the high-pressure spool, and subsequently to a low speed turbine of the low speed spool, driving the low speed spool. The rotor assembly is typically coupled to the low speed spool and driven by the low speed spool.

Blade loss may cause damage to the aircraft, especially where rotors of the engine are not enclosed within a nacelle or fan duct, which may at least partially contain a thrown blade.

BRIEF DESCRIPTION

Aspects and advantages of the invention will be set forth in part in the following description, or may be obvious from the description, or may be learned through practice of the invention.

In an aspect of the present disclosure, an aircraft defining a longitudinal direction and a lateral direction is provided. The aircraft includes: a fuselage; an engine mounted at a location spaced from the fuselage of the aircraft, the engine comprising a plurality of rotor blades; and a fuselage shield attached to or formed integrally with the fuselage at a location in alignment with the plurality of rotor blades along the lateral direction, the fuselage shield comprising a first layer defining a first density and a second layer defining a second density, the first density being different than the second density.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5 is a cross-sectional view of a fuselage shield in accordance with another exemplary embodiment of the present disclosure.

DETAILED DESCRIPTION

Figure 1:
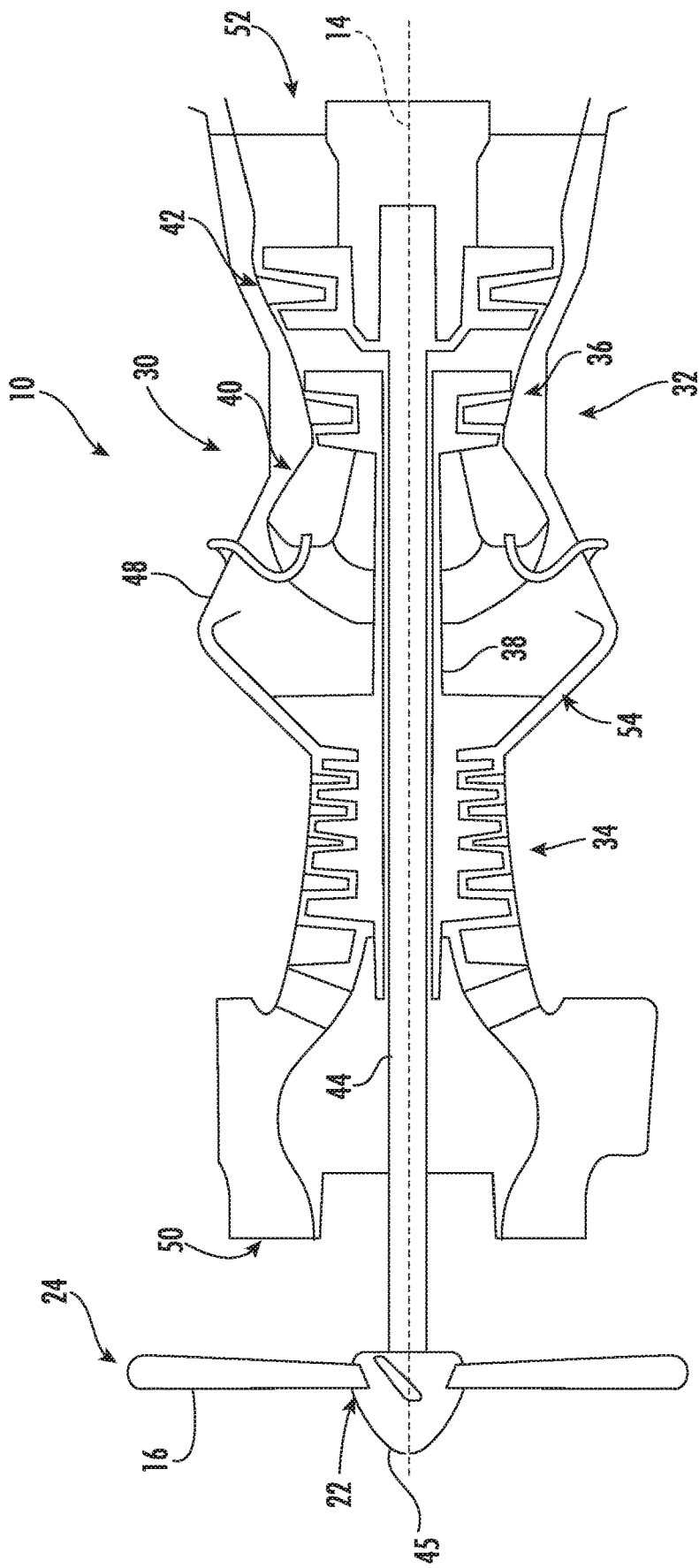
FIG. 1 is a schematic, cross-sectional view of a gas turbine engine in accordance with an exemplary aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The inventors of the present disclosure have found that certain benefits may be achieved by removing a nacelle from a traditional turbofan engine. The inventors of the present disclosure have also found that it may be beneficial to include a fuselage shield to provide additional protection for the fuselage proximate the rotor blades of the rotor assembly. The inventors of the present disclosure have also found that there are multiple functions that may be needed to be performed by the fuselage shield, including, e.g., protection against debris piercing the fuselage, absorption of energy from the debris, and preventing the energy from materially deforming the fuselage.

More specifically, the inventors of the present disclosure have found that a fuselage shield configured to effectively provide protection against debris piercing the fuselage, absorption of energy from the debris, and preventing the energy from materially deforming the fuselage would be useful. In at least certain exemplary aspects of the present disclosure, such benefits may be provided for an aircraft having an unducted rotor engine mounted at a location spaced from a fuselage of the aircraft through incorporation of a layered fuselage shield. The fuselage shield may be attached to or formed integrally with the fuselage at a location in alignment with a single stage of rotor blades of the unducted rotor assembly along the lateral direction. The fuselage shield may include a first layer defining a first density and a second layer defining a second density, with the first density being different than the second density.

Additionally or alternatively, a thickness of the first layer may be different than a thickness of the second layer.

In certain aspects, the first layer may be an energy distribution layer, and the second layer may be an energy absorption layer.

Additionally or alternatively, still, the fuselage shield may include a load spreading layer configured to be positioned adjacent to the fuselage of the aircraft.

Moreover, in certain exemplary embodiments, the second layer may be hermetically sealed within an interior of the fuselage shield. Such may enable the fuselage shield to be more easily added to an aircraft as a stand-alone product.

Referring now to the Drawings, FIG. 1 shows an elevational cross-sectional view of an exemplary embodiment of a gas turbine engine 10 as may incorporate one or more inventive aspects of the present disclosure. In particular, the exemplary gas turbine engine 10 of FIG. 1 is a configured as a turboprop engine defining an axial direction A, a radial direction R, and a circumferential direction C (see, e.g., FIG. 4, extending about the axial direction A). As is seen from FIG. 1, the engine 10 includes an array of airfoils arranged around a central longitudinal axis 14 of engine 10, and more particularly includes an array of rotor blades 16 arranged around the central longitudinal axis 14 of engine 10. The rotor blades 16 are arranged in typically equally spaced relation around the centerline 14, and each blade has a root 22 and a tip 24 and a span defined therebetween. The rotor assembly 12 further includes a hub 45 located forward of the plurality of rotor blades 16.

It will be appreciated, that as used herein, the term "rotor blades" is used generically to refer to any rotatable blade, typically of an airfoil shape, that is rotatable by the engine 10 to generate thrust or compress air for the engine 10. For example, in the embodiment of FIG. 1, the rotor blades 16 are sometimes also referred to as propeller blades, whereas in the embodiment of FIG. 2, discussed below, the rotor blades 16 are sometimes also referred to as fan blades.

Additionally, the engine 10 includes a turbomachine 30 having core (or high speed system) 32 and a low speed system. The core 32 generally includes a high-speed compressor 34, a high speed turbine 36, and a high speed shaft 38 extending therebetween and connecting the high speed compressor 34 and high speed turbine 36. The high speed compressor 34 (or at least the rotating components thereof), the high speed turbine 36 (or at least the rotating components thereof), and the high speed shaft 38 may collectively be referred to as a high speed spool of the engine. Further, a combustion section 40 is located between the high speed compressor 34 and high speed turbine 36. The combustion section 40 may include one or more configurations for receiving a mixture of fuel and air, and providing a flow of combustion gasses through the high speed turbine 36 for driving the high speed spool.

The low speed system similarly includes a low speed turbine 42 (or power turbine) and a low speed shaft 46 extending between and connecting low speed turbine 42 and the plurality of rotor blades 16. More specifically, as shown in the embodiment illustrated in FIG. 1, the low speed turbine 42 rotates and transfers rotational energy to the rotor blades 16 through the low speed shaft 46.

Referring still to FIG. 1, the turbomachine 30 is generally encased in a cowl 48. The cowl 48 defines at least in part an inlet 50 and an exhaust 52, and includes a turbomachinery flowpath 54 extending between the inlet 50 and the exhaust 52.

Figure 2:
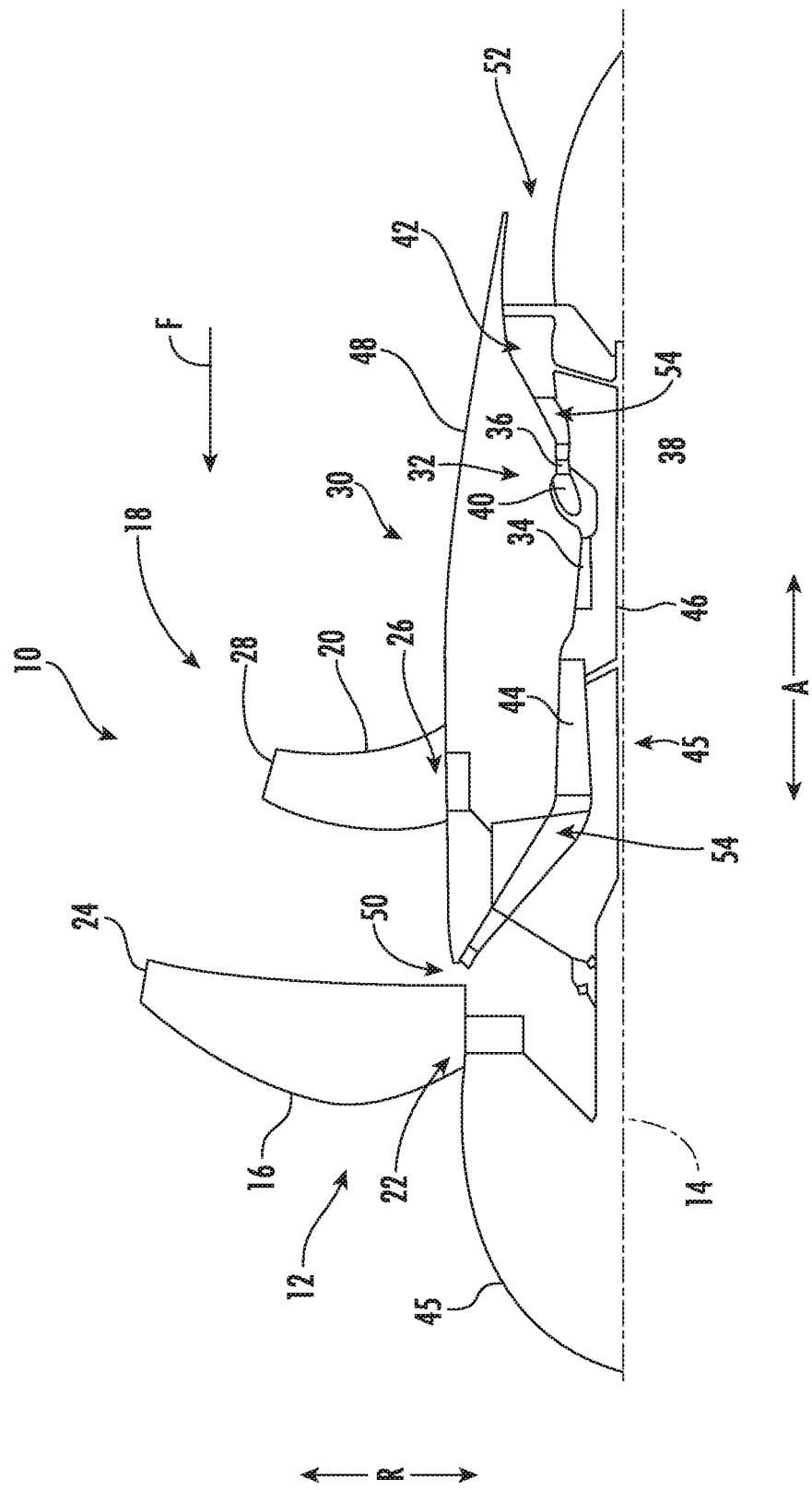
FIG. 2 is a schematic, cross-sectional view of a gas turbine engine in accordance with another exemplary aspect of the present disclosure.

It will be appreciated, however, that the exemplary gas turbine engine of FIG. 1 is provided by way of example only. In other exemplary embodiments, the gas turbine engine may have any other suitable configuration, such as any other suitable unducted, or open rotor, configuration. For example, referring now to FIG. 2, an elevational cross-sectional view of a gas turbine engine 10 in accordance with another exemplary embodiment of the present disclosure is provided. In particular, the exemplary gas turbine engine 10 of FIG. 2 is a configured as a single unducted rotor engine. The exemplary single unducted rotor engine of FIG. 2 may be configured in a similar manner as the exemplary turboprop engine of FIG. 1. For example, the exemplary single unducted rotor engine of FIG. 2 generally defines an axial direction A, a radial direction R, and a circumferential direction C (see, e.g., FIG. 3, extending about the axial direction A). Moreover, the engine 10 includes an array of airfoils arranged around a central longitudinal axis 14 of engine 10, and more particularly includes an array of rotor blades 16 arranged around the central longitudinal axis 14 of engine 10.

Additionally, the engine 10 includes a turbomachine 30 having core (or high speed system) 32, a low speed system, and a combustion section 40 located between a high speed compressor 34 and a high speed turbine 36 of the core 32. Moreover, as with the embodiment above, the low speed system includes a low speed turbine 42 and a low speed shaft 46. However, for the embodiment shown, the low speed system further includes a low speed compressor or booster 44, with the slow speed shaft 46 extending between and connecting the low speed compressor 44 and low speed turbine 42.

It will be appreciated that although the engine 10 is depicted with the low speed compressor 44 positioned forward of the high speed compressor 34, in certain embodiments the compressors 34, 44 may be in an interdigitated arrangement. Additionally, or alternatively, although the engine 10 is depicted with the high speed turbine 36 positioned forward of the low speed turbine 42, in certain embodiments the turbines 36, 42 may similarly be in an interdigitated arrangement.

Also similar to the embodiment of FIG. 1, for the embodiment of FIG. 2 the turbomachine 30 is generally encased in a cowl 48 defining at least in part an inlet 50 and an exhaust 52, and including a turbomachinery flowpath 54 extending between the inlet 50 and the exhaust 52. For the embodiment shown, the inlet 50 is an annular or axisymmetric 360 degree inlet 50 providing a path for incoming atmospheric air to enter the turbomachinery flowpath 54 (and compressors 44, 34, combustion section 40, and turbines 36, 42).

Moreover, the exemplary gas turbine engine 10 depicted in FIG. 2 additionally includes a non-rotating vane assembly 18 positioned aft of the rotor assembly 12 (i.e., non-rotating with respect to the central axis 14), which includes an array of airfoils also disposed around central axis 14, and more particularly includes an array of vanes 20 disposed around central axis 14. The rotor blades 16 are arranged in typically equally spaced relation around the centerline 14, and each blade has a root 22 and a tip 24 and a span defined therebetween. It will be appreciated that the vanes 20 each have a root 26 and a tip 28 and a span defined therebetween. The rotor assembly 12 further includes a hub 45 located forward of the plurality of rotor blades 16.

Briefly, the inlet 50 is located between the rotor blade assembly 12 and the fixed or stationary vane assembly 18 for the embodiment shown. Such a location may be advantageous for a variety of reasons, including management of icing performance as well as protecting the inlet 50 from various objects and materials as may be encountered in operation. It will be appreciated, however, that in other embodiments the inlet 50 may be positioned at any other suitable location, e.g., aft of the vane assembly 18, arranged in a non-axisymmetric manner, etc.

Referring still to FIG. 2, the vane assembly 18 extends from the cowl 48 and is positioned aft of the rotor assembly 12. The vanes 20 of the vane assembly 18 may be mounted to a stationary frame or other mounting structure and do not rotate relative to the central axis 14. For reference purposes, FIG. 1 also depicts the forward direction with arrow F, which in turn defines the forward and aft portions of the system. As shown in FIG. 1, the rotor assembly 12 is located forward of the turbomachine 30 in a "puller" configuration, and the exhaust 52 is located aft of the guide vanes 20. As will be appreciated, the vanes 20 of the vane assembly 18 may be configured for straightening out an airflow (e.g., reducing a swirl in the airflow) from the rotor assembly 12 to increase an efficiency of the engine 10. For example, the vanes 20 may be sized, shaped, and configured to impart a counteracting swirl to the airflow from the rotor blades 16 so that in a downstream direction aft of both rows of airfoils (e.g., blades 16, vanes 20) the airflow has a greatly reduced degree of swirl, which may translate to an increased level of induced efficiency. Further discussion regarding the vane assembly 18 is provided below.

It will be appreciated, however, that the exemplary single rotor unducted engine depicted in FIG. 2 is by way of example only, and that in other exemplary embodiments, the engine 10 may have any other suitable configuration, including, for example, any other suitable number of shafts or spools, turbines, compressors, etc. Additionally, or alternatively, in other exemplary embodiments, any other suitable gas turbine engine may be provided. For example, in other exemplary embodiments, the gas turbine engine may be a ducted turbofan engine, a turboshaft engine, a turboprop engine, turbojet engine, etc. Further, although the exemplary engine 10 depicted in FIG. 2 includes a single unducted rotor, in other exemplary embodiments, the engine may include multiple unducted rotors (e.g., a pair of counter-rotating rotors).

Figure 3:
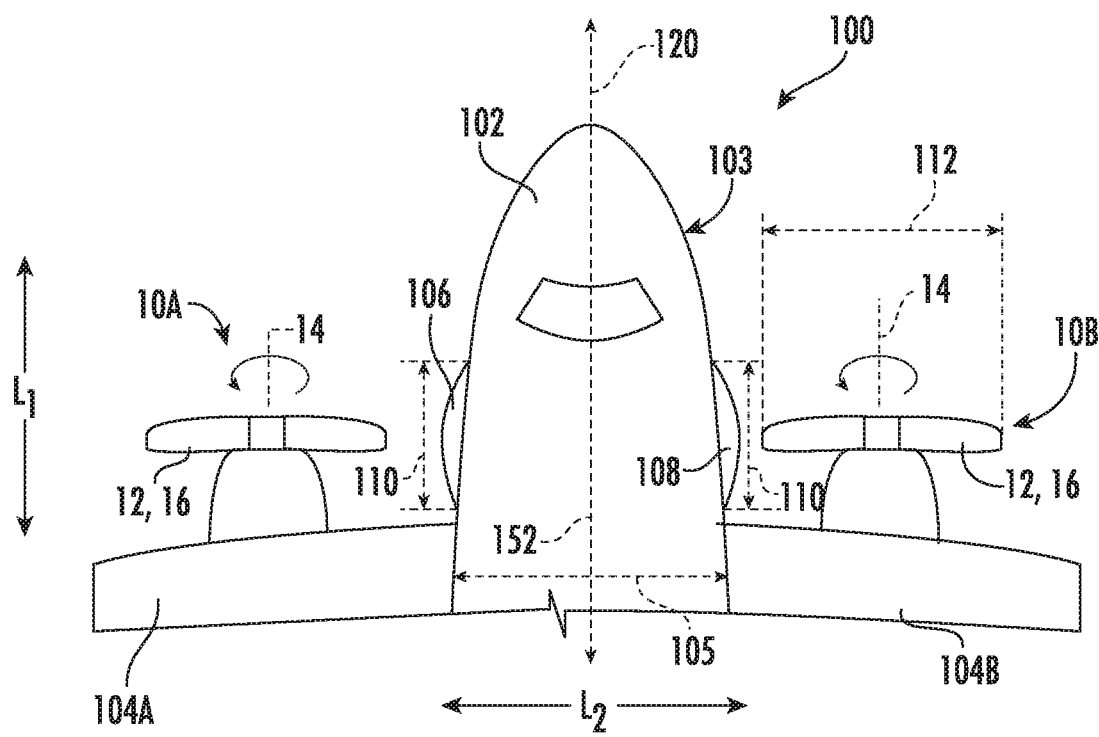
FIG. 3 is a schematic view of an aircraft incorporating a gas turbine engine in accordance with FIGS. 1 and/or 2.

Referring now to FIG. 3, a schematic view of an aircraft 100 including an engine 10 in accordance with an exemplary aspect of the present disclosure is provided. The exemplary aircraft 100 depicted generally includes a fuselage 102, a first wing 104A extending outwardly from a first side/port side of the fuselage 102, and a second wing 104B extending outwardly from a second side/starboard side of the fuselage 102. The exemplary aircraft 100 further includes a first engine 10A mounted to the first wing 104A in an under wing configuration and a second engine 10B mounted to the second wing 104B in and under wing configuration. The first and second engines 10A, 10B may each be configured in a similar manner as the exemplary engine 10 of FIG. 1. Accordingly, each of the first and second engines 10A, 10B include a rotor assembly 12 rotatable about a centerline axis 14 of the respective engine.

As will be appreciated, the rotor assembly 12 of the first and second engines 10A, 10B include a single stage of unducted rotor blades 16. As such, there is no nacelle or similar structures surrounding the stage of rotor blades 16 to contain the rotor blades 16 in the event of a failure. Although not depicted, the first and second engines 10A, 10B may additionally include a stage of stationary guide vanes (similar to the stage of guide vanes 18 of FIG. 1).

Accordingly, for the exemplary aircraft 100 depicted, the aircraft 100 includes a first fuselage shield 106 attached to or formed integrally with the first side/port side of the fuselage 102 proximate the rotor assembly 12 of the first engine 10A and a second fuselage shield 108 attached to or formed integrally with the second side/starboard side of the fuselage 102 proximate to the rotor assembly 12 of the second engine 10B.

More specifically, for the embodiment depicted, the fuselage 102 includes a fuselage exterior 103, which is generally an exterior surface of the fuselage 102, defined by an outer layer of the fuselage 102 (e.g., an outer layer of sheet metal, optionally including one or more coatings). The first fuselage shield 106 is placed on the fuselage exterior 103 and secured thereto, and similarly, the second fuselage shield 108 is also placed on the fuselage exterior 103 and secured thereto. In such a manner, it will be appreciated that for the embodiment depicted the first and second fuselage shields 106, 108 are not integrated into an original design of the fuselage 102 and/or located within an outer layer of the fuselage 102, and instead are added as a supplement to the fuselage exterior 103 as described herein.

More specifically, referring particular to the first engine 10A, it will be appreciated that the aircraft 100 generally defines a longitudinal direction L1 and a lateral direction L2. The first fuselage shield 106 is attached to the fuselage 102 at a location aligned with the plurality of rotor blades 16 of the rotor assembly 12 of the first engine 10A along the longitudinal direction L1. Further, the first fuselage shield 106 defines a length 110 along the longitudinal direction L1, and the plurality of rotor blades 16 of the rotor assembly 12 define a rotor assembly diameter 112. For the embodiment depicted, the length 110 of the first fuselage shield 106 is equal to at least about 50% of the rotor assembly diameter 112, such as at least about 60% of the rotor assembly diameter 112, such as at least about 75% of the rotor assembly diameter 112, such as up to about 800% of the rotor assembly diameter 112.

Notably, the exemplary aircraft 100 depicted may generally be referred to as a "narrow body" aircraft having a single aisle extending along a length thereof. In certain embodiments, the fuselage defines a width 105 along the lateral direction L2 of at least 80 inches, such as at least 90 inches, such as at least 100 inches, such as at least 110 inches, such as at least 130 inches. However, in other embodiments, the aircraft 100 may alternatively be configured as a "wide body" aircraft having a multiple aisles extending along a length thereof and wider fuselage 102, such as up to 400 inches wide or up to 350 inches wide or up to 300 inches wide. In at least certain exemplary embodiments, the highest seating capacity of a narrow-body aircraft may be 295 passengers, while a wide body aircraft may be able to accommodate between 250 and 600 passengers. For example, two-abreast aircraft typically seat 4 to 19 passengers, three-abreast typically seat 24 to 45 passengers, four-abreast aircraft typically seat 44 to 80 passengers, five-abreast aircraft typically seat 85 to 130 passengers, six-abreast aircraft typically seat 120 to 230 passengers. By contrast, a regional aircraft is generally smaller than the narrow and wide body aircraft, capable of shorter flight times and carrying less passengers and/or cargo. For example, typical regional aircraft are designed to fly 100 passengers or less.

For embodiments of the present disclosure, the aircraft may have a cruise altitude engine and aircraft operation at or above Mach 0.5, approximately Mach 0.55 and approximately Mach 0.85, or between March 0.75 and Mach 0.85 for a cruise altitude. For example, an aircraft may have a cruise speed at cruise altitude. In various embodiments, the engine is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degree Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

In such a manner, it will be appreciated that the aircraft 100 is generally configured to carry a higher number of passengers, crew, and/or cargo than smaller aircraft, such as typical regional turboprop aircraft. With these smaller aircraft, the rotor blades (e.g., propellers) of the engines tend to be relatively small and light with a relatively small diameter, and the power delivered by the engine is lower than the larger and more powerful engines used on narrow body and wide body class commercial passenger aircraft. Moreover, among the disclosed embodiments of an unducted rotor engine the delivered power and rotor or blade size may be significantly larger than for a turboprop such that a risk of catastrophic damage in a failure event may be considered higher. For example, the rotor or blade size may be from 11 to 14 feet in diameter, or 11 feet, 12 feet, or between 12 and 14 feet in diameter. Taking into consideration these factors while, at the same time, addressing the impact in terms of increased weight, cost, and complexity and decreased efficiency (e.g., due to aerodynamic drag) associated with a shielding, the inventors arrived at a design that is believed to strike the correct balance between safety and efficiency, replaceability and maintenance of the shielding. It will be appreciated that the embodiments of shielding disclosed herein address the unique challenges faced in respect to passenger and crew protection for narrow and wide body commercial passenger aircraft engine or aircraft designers.

By contrast with current narrow body and wide body aircraft, the inventors of the present disclosure have found that when desirable to incorporate an open rotor engine (as opposed to, e.g., a ducted turbofan engine), and particularly when desirable to incorporate an open rotor engine with rotor blades defining a relatively large diameter (such as at least six feet, such as at least eight feet, such as at least ten feet, such as at least twelve feet, such as up to 22 feet; such an engine is depicted in the embodiment of FIG. 2) the benefit and need of the fuselage shielding described herein may weigh in favor of inclusion of the fuselage shielding despite the increased weight and minimized, but still present, additional drag on the aircraft 100. As will be appreciated from the description herein, the fuselage shielding disclosed may allow for an aircraft to incorporate an engine 10 with unducted rotor blades without having to redesign and/or reconstruct the fuselage 102 to incorporate the fuselage shielding the inventors have found to be beneficial.

It will be appreciated, however, that although described above as being applied to narrow body and wide body aircraft, in other embodiments, aspects of the present disclosure may further be applied to regional aircraft.

Figure 4:
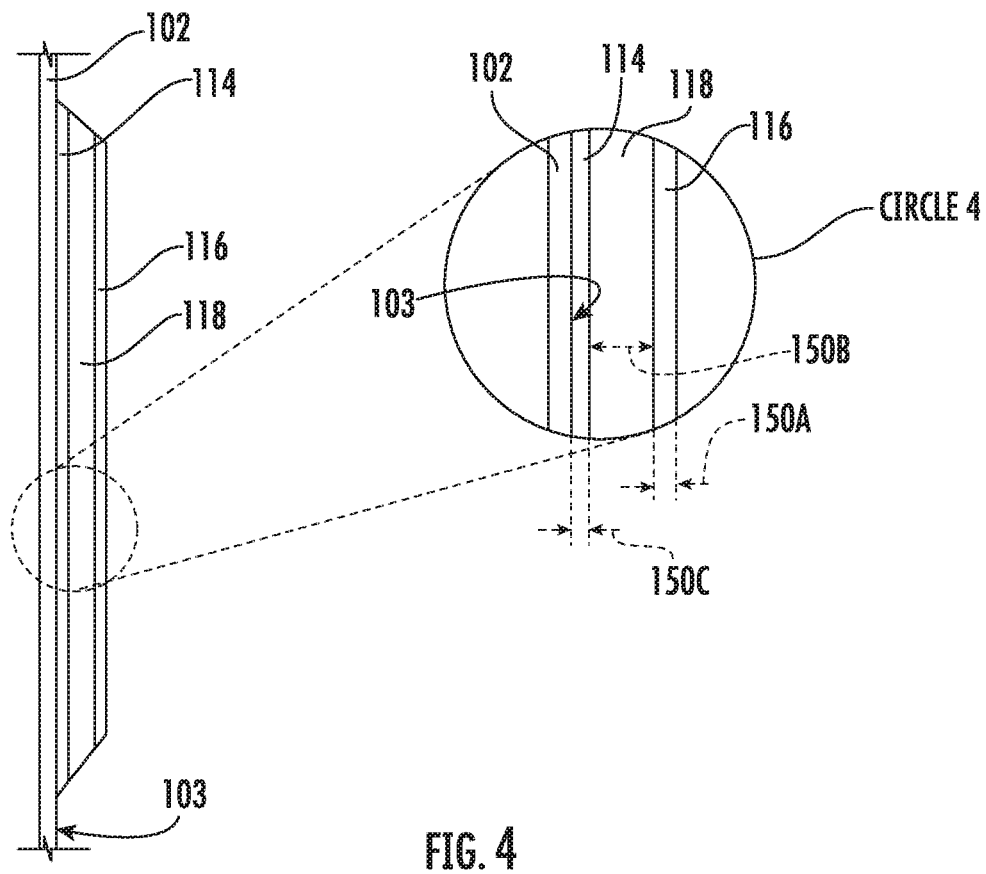

Further, referring now to FIG. 4, it will be appreciated that the first fuselage shield 106 defines a plurality of layers. More specifically, the first fuselage shield 106 includes a first layer and a second layer. In the embodiment shown, the first layer is an energy distribution layer 116 and the second layer is an energy absorption layer 118. The exemplary fuselage shield 106 depicted additionally includes a third layer, which for the embodiment shown is a load spreading layer 114. The load spreading layer 114 is positioned adjacent to the fuselage 102 and the energy distribution layer 116 is spaced from the fuselage 102. Further, the energy absorption layer 118 is positioned between the load spreading layer 114 and the energy absorption layer 118. More specifically, for the embodiment shown, the energy distribution layer 116 is positioned closer to the stage of unducted rotor blades 16 of the first engine 10A than the energy absorption layer 118, and the energy absorption layer 118 is positioned closer to the stage of unducted rotor blades 16 of the first engine 10A than the load spreading layer 114.

In the event of a failure of the rotor assembly 12 of the first engine 10A, debris may strike the energy distribution layer 116, which may prevent such debris from cutting through and penetrating the first fuselage shield 106. The energy absorption layer 118 may absorb the energy transferred from the energy distribution layer 116 from the debris. Finally, the load spreading layer 114 may distribute energy from the energy absorption layer 118 across the fuselage 102 to prevent any deformation of the fuselage 102.

In certain exemplary embodiments, the energy distribution layer 116 may be a metal (such as one or more pieces of sheet metal), a Kevlar, a carbon fiber composite (e.g., such as a carbon fiber composite with a polymeric resin, such as epoxy), a ceramic (such as a ceramic plate or ceramic fiber), a combination thereof, or other material capable of stopping debris from penetrating therethrough. The load spreading layer 114 may be a metal layer, a graphite or an epoxy layer, a carbon fiber composite (e.g., such as a carbon fiber composite with a polymeric resin, such as epoxy), etc.

Further, it will be appreciated that the energy absorption layer 118 may be formed of any material capable of absorbing a desired amount of energy. For example, referring now to FIGS. 5 and 6, close-up, cross sectional views are provided of two fuselage shields 106 in accordance with two exemplary embodiments of the present disclosure. Each of the fuselage shields 106 may be configured in similar manner as the exemplary first fuselage shield 106 described above. Accordingly, the fuselage shields 106 of FIGS. 5 and 6 generally include a load spreading layer 114, an energy absorption layer 118, and an energy distribution layer 116. The load spreading layer 114 and energy distribution layer 116 may be formed of materials described above, or other suitable materials. The energy absorption layer 118 in these embodiments are formed of a relatively low dense material, having a low solidity percentage (a percent by volume that the material that is a solid (as compared to air or other gas) under nominal stresses). For example, the material forming the energy absorption layers 118 in these embodiments may define a solidity percentage less than 75%, such as less than 60%, such as less than 50%, such as less than 40%, such as at least 10%, such as at least 25%.

Figure 5:
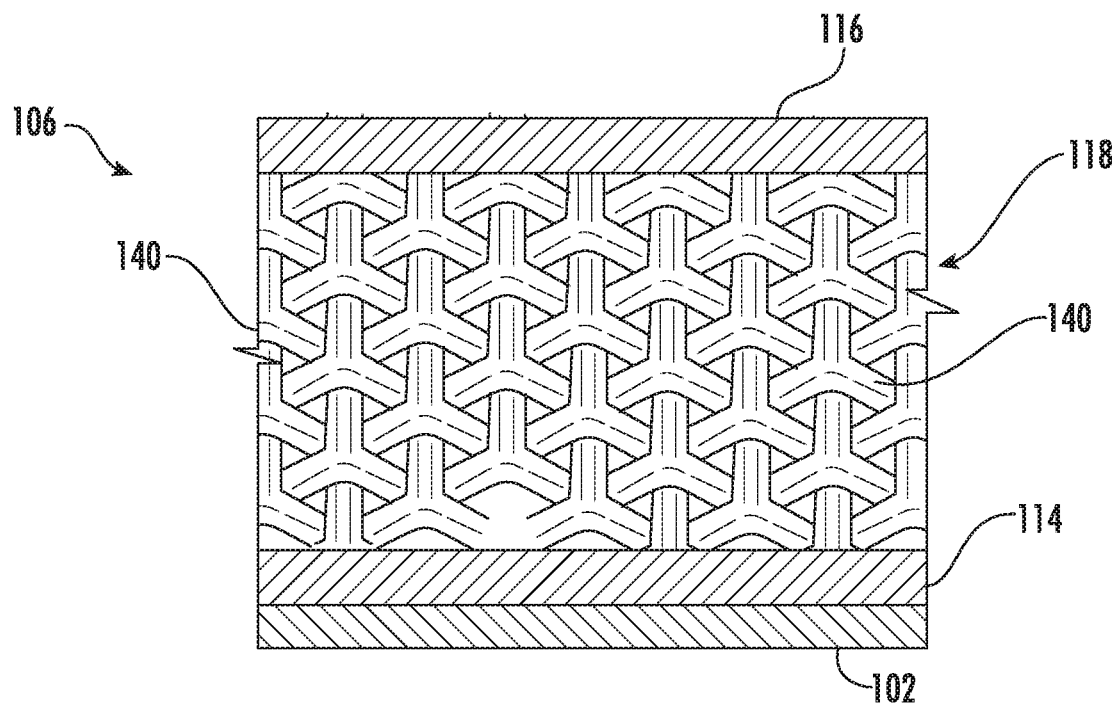
FIG. 5 is a schematic view of a fuselage shield in accordance with an exemplary embodiment of the present disclosure.

Referring particularly to FIG. 5, it will be appreciated that the energy distribution layer 116 is formed of a lattice structure. The lattice structure includes a plurality of interwoven members 140, which may bend to allow the structure to compress and absorb energy in the event the fuselage shield 106 is struck with debris. The lattice structure may be formed through a 3D printing process/additive manufacturing process, or any other suitable formation process. The members 140 may be formed of a metal, a plastic, an elastomeric material, etc.

Figure 6:
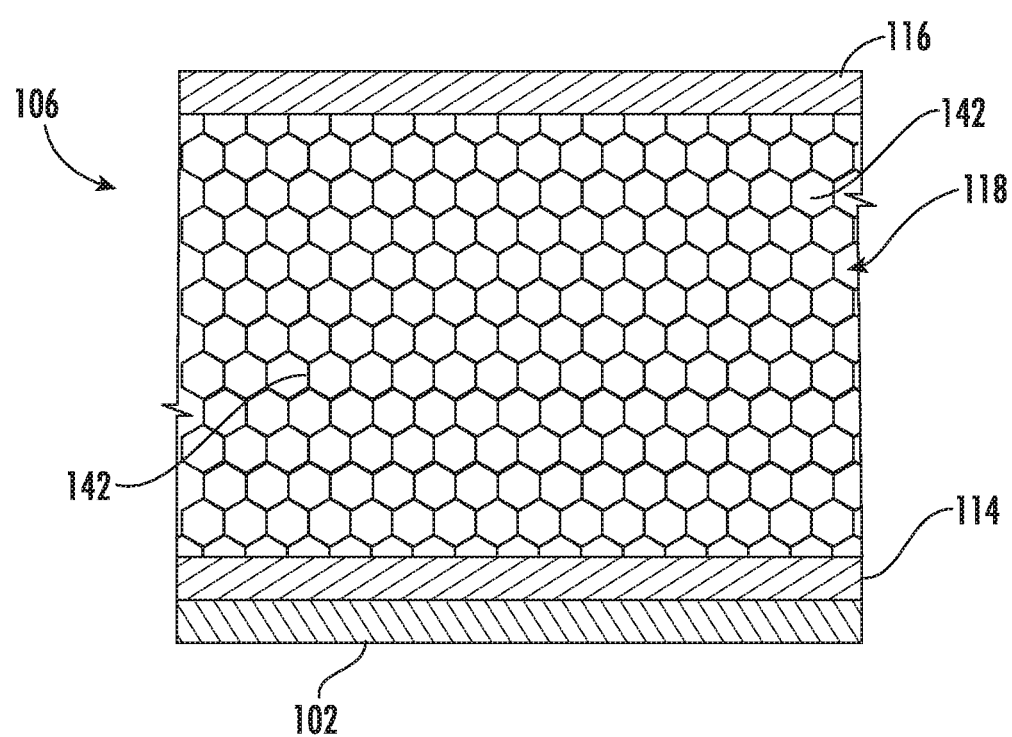
FIG. 6 is a cross-sectional view of a fuselage shield in accordance with yet another exemplary embodiment of the present disclosure.

Referring particularly to FIG. 6, it will be appreciated that the energy distribution layer 116 is formed of a honeycomb structure. The honeycomb structure includes a plurality of members 142 connected to form a polygonal geometric pattern, and more specifically for the embodiment shown, to form a hexagonal geometric pattern. The members 142 may be flexible to allow the material to compress and absorb energy in the event the fuselage shield 106 is struck with debris. The honeycomb structure may be formed through a 3D printing process/additive manufacturing process, or any other suitable formation process. The members 142 may be formed of a metal, a plastic, an elastomeric material, etc.

It will be appreciated, however, that in other exemplary embodiments, the energy distribution layer 116 may be formed of any other suitable material/structure. For example, in other embodiments, the energy distribution layer 116 may be formed of, e.g., a foam material, a polyurethane material, or any other suitable material capable of absorbing energy. Additionally, the energy distribution layer 116 may be formed of any other suitable structure capable of absorbing energy.

Figure 7:
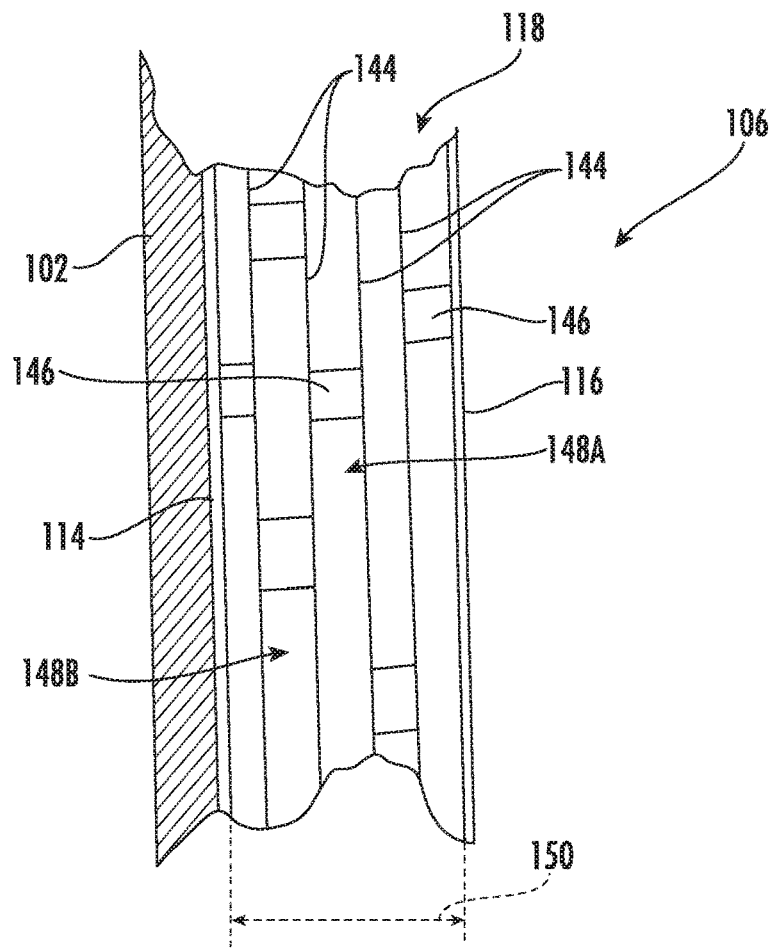
FIG. 7 is a cross-sectional view of a fuselage shield in accordance with still another exemplary embodiment of the present disclosure.
Figure 8:
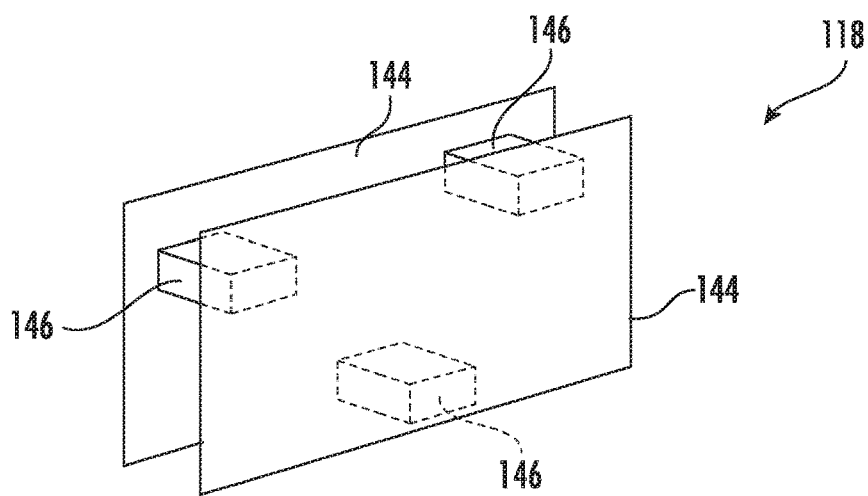
FIG. 8 is a perspective view of a portion of the exemplary fuselage shield of FIG. 7.

For example, referring now to FIGS. 7 and 8, close-up views are provided of a fuselage shield 106 in accordance with another exemplary embodiment of the present disclosure. The fuselage shield 106 depicted may also be configured in a similar manner as the exemplary first fuselage shield 106 described above. Accordingly, the fuselage shield of FIGS. 1 and 8 generally includes a load spreading layer 114, an energy absorption layer 118, and an energy distribution layer 116. The load spreading layer 114 and energy distribution layer 116 may be formed of materials described above, or any other suitable material. However, the energy absorption layer 118 of the embodiment shown is formed of a plurality of sheets 144 and plurality of spacers 146 positioned between adjacent sheets 144 of the plurality of sheets 144.

Specifically, referring first to FIG. 7, providing a close-up, cross-sectional view of the energy distribution layer 116, it will be appreciated that the plurality of sheets 144 are spaced along a thickness 150 of the fuselage shield 106 between the load spreading layer 114 and the energy distribution layer 116. Further, the plurality of sheets 144 depicted includes at least two sheets 144, and more specifically includes four sheets 144. The plurality of sheets 144 may include up to twenty-five (25) sheets 144. The plurality of sheets 144 may be formed of a sheet metal material, a metal alloy, a composite, or any other suitable material. For example, in certain embodiments, one or more of the plurality of sheets 144 may be formed of a metal composite, a steel, a depleted uranium, a tungsten, a titanium, an Inconel, a molybdenum, an aluminum, a magnesium, an aluminum-lithium alloy, combinations thereof, etc.

Further, referring now particularly to FIG. 8, providing a perspective view of section of a pair of adjacent sheets 144, it will be appreciated that between each pair of adjacent sheets 144, the energy absorption layer 118 includes a plurality of spacers 146. For example, the energy absorption layer 118 may include at least two spacers 146, and up to one hundred (100) spacers 146, such as up to fifty (50) spacers 146, such as up to twenty-five (25) spacers 146. The spacers 146 may define a length to width ratio between 10:1 and 1:10, such as between 5:1 and 1:5, such as between 2:1 and 1:2, such as equal to about 1:1. Moreover, referring also to FIG. 7, it will be appreciated that the spacers 146 are generally misaligned along the thickness 150 of the energy absorption layer 118. Specifically, for the embodiment shown, the spacers 146 in a first gap 148A defined between adjacent sheets 144 do not overlap as viewed along a thickness 150 of the fuselage shield 106 with the spacers 146 in a second gap 148B (positioned adjacent to the first gap 148A and defined in part by a common sheet 144).

In such a manner, it will be appreciated that for the exemplary energy absorption layer 118 depicted in FIGS. 7 and 8, the sheets 144 may deform to absorb energy transferred thereto from the energy distribution layer 116.

Referring now back also to FIG. 4, it will be appreciated from the discussion hereinabove that the load spreading layer 114 defines a first density, the energy absorption layer 118 defines a second density, and the energy distribution layer 116 defines a third density. For the embodiment depicted, the first density and the third density are each greater than the second density of the energy absorption layer 118. For example, in certain exemplary embodiments, the first density, the third density, or both may be at least about 20% greater than the second density, such as at least about 50% greater, such as at least about 100% greater, such as at least about 200% greater, such as at least about 500% greater, such as up to about 10,000% greater than the second density.

Further, referring specifically to the callout Circle 4 in FIG. 4, it will be appreciated that the energy distribution layer 116 defines a first thickness 150A, the energy absorption layer 118 defines a second thickness 150B, and the load spreading layer 114 defines a third thickness 150C. As used herein, the term "thickness" refers to a maximum thickness of the component being described, such as a maximum thickness of the layer of the fuselage shield 106.

For the embodiment show, the first thickness 150A is at least 0.05 inches and up to 2.5 inches, such as at least 0.1 inches, such as at least 0.5 inches, such as at least 0.75 inches, such as up to 2.25 inches, such as up to 2 inches. Further for the embodiment show, the third thickness 150C is at least 0.05 inches and up to 2.5 inches, such as at least 0.1 inches, such as at least 0.5 inches, such as at least 0.75 inches, such as up to 2.25 inches, such as up to 2 inches. Further, still, for the embodiment shown, the second thickness 150B is at least 0.25 inches and up to 4 inches, such as at least 0.35 inches, such as at least 0.5 inches, such as at least 1 inch, such as at least 2 inches, such as up to 3.75 inches, such as up to 3.5 inches.

In such a manner, it will be appreciated that the second thickness 150B of the energy absorption layer 118 may be greater than the first thickness 150A and third thickness 150C, such as at least about 50% greater, such as at least about 100% greater, such as up to about 10000% greater. Such may allow for the lower density of the energy absorption layer 118, which may allow for the energy absorption layer 118 to absorb more energy in the event the fuselage shield 106 is struck with debris.

As will also be appreciated from the Figs. and the discussion herein, it may be beneficial to configure and/or orient the fuselage shield for the estimated debris it is meant to protect the fuselage 102 from. For example, referring now to FIGS. 9 and 10 (and also back to FIG. 3), it will be appreciated that in certain exemplary embodiments, the first fuselage shield 106 may be configured in a different manner than the second fuselage shield 108. For example, it will be appreciated that, as indicated by the circular arrows in FIG. 3 (extending about centerlines 14), the plurality of rotor blades 16 of the rotor assemblies 12 of the first and second engines 10A, 10B rotate in the same rotational direction, but given their location on opposing sides of the fuselage 102, approach the fuselage 102 in a different manner. For example, the rotor blades 16 of the rotor assembly 12 of the first engine 10A approach from below the aircraft 100, while the rotor blades 16 of the rotor assembly 12 of the second engine 10B approach from above the aircraft 100. As such, an estimated strike from debris from the first engine 10A may be different from an estimated strike from debris from the second engine 10B in the event of a failure of these engines.

Therefore, in at least certain exemplary embodiments, the first fuselage shield 106 is positioned asymmetrically relative to the second fuselage shield 108 relative to a reference plane 120 extending along the longitudinal direction L1 and a vertical direction V of the aircraft 100, through a center 152 of the fuselage 102 and of the aircraft 100.

Specifically, for the embodiment depicted, the first fuselage shield 106 may be mounted to the fuselage 102 at a different position and/or in a different orientation than the second fuselage shield 108. More specifically, referring particularly to FIG. 9, providing a plan view of a first side/port side of the fuselage 102, and to FIG. 10, providing a plan view of a second side/starboard side of the fuselage 102, it will be appreciated that the first fuselage shield 106 and second fuselage shield 108 may be mounted in a manner particular for the specific engines, and in a manner to most appropriately accommodate any debris that may result from such engines.

Figure 10:
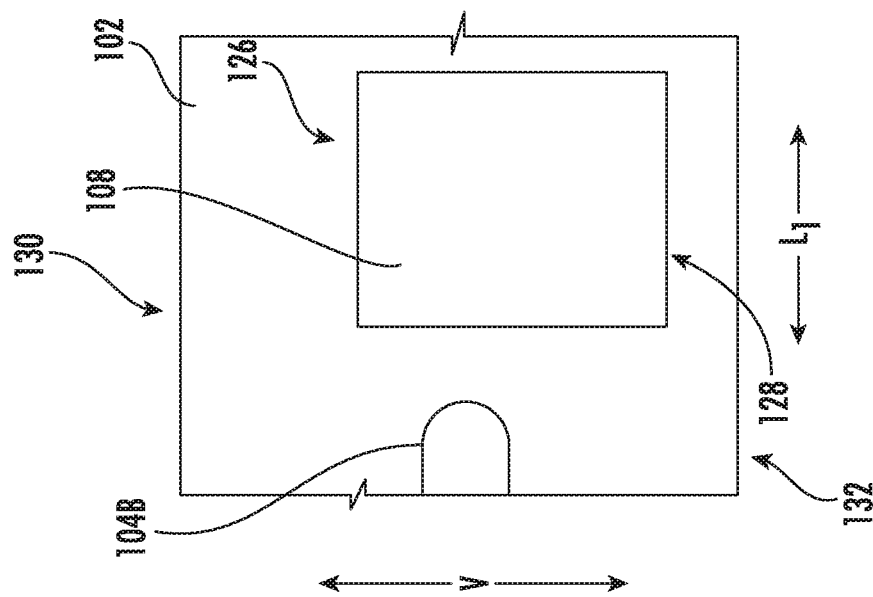
FIG. 10 is a schematic view of the fuselage of the aircraft of FIG. 3 including a second fuselage shield.
Figure 9:
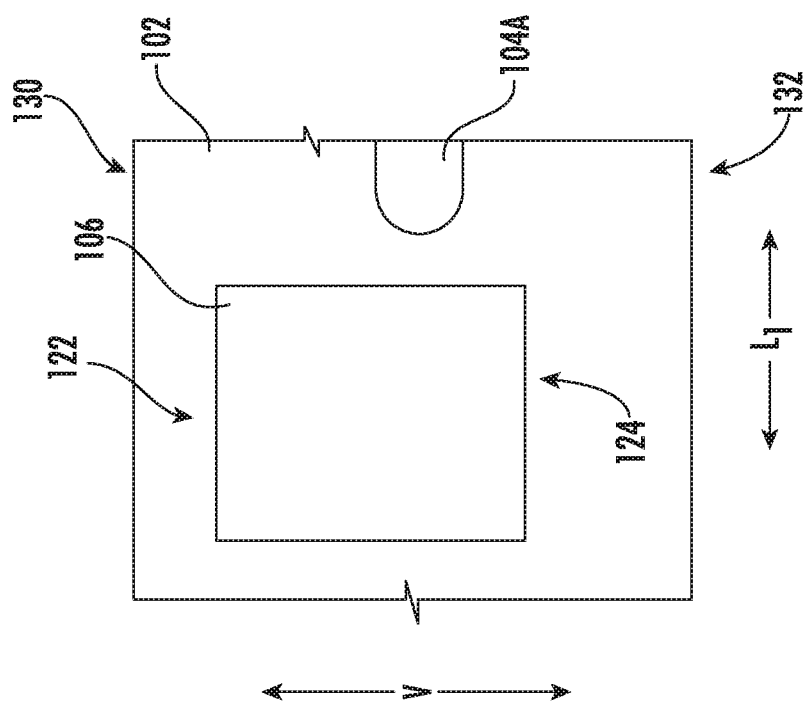
FIG. 9 is a schematic view of a fuselage of the aircraft of FIG. 3 including a first fuselage shield.

More specifically, still, as will be appreciated from FIGS. 9 and 10, the asymmetrical positioning of the first fuselage shield 106 and the second fuselage shield 108 relative to the reference plane 120 is derived from a vertical positioning of the first fuselage shield 106 and second fuselage shield 108. For example, the first fuselage shield 106 defines a top 122 and a bottom 124 along the vertical direction V, and similarly, the second fuselage shield 108 defines a top 126 and a bottom 128 along the vertical direction V. The top 122 of the first fuselage shield 106 is position higher along the vertical direction V than the top 126 of the second fuselage shield 108, and as such is closer to a top portion 130 of the fuselage 102. Further, the bottom 124 of the second fuselage shield 108 is positioned lower along the vertical direction V than the bottom 128 of the first fuselage shield 106, and as such is closer to a bottom portion 132 of the fuselage 102.

Figure 11:
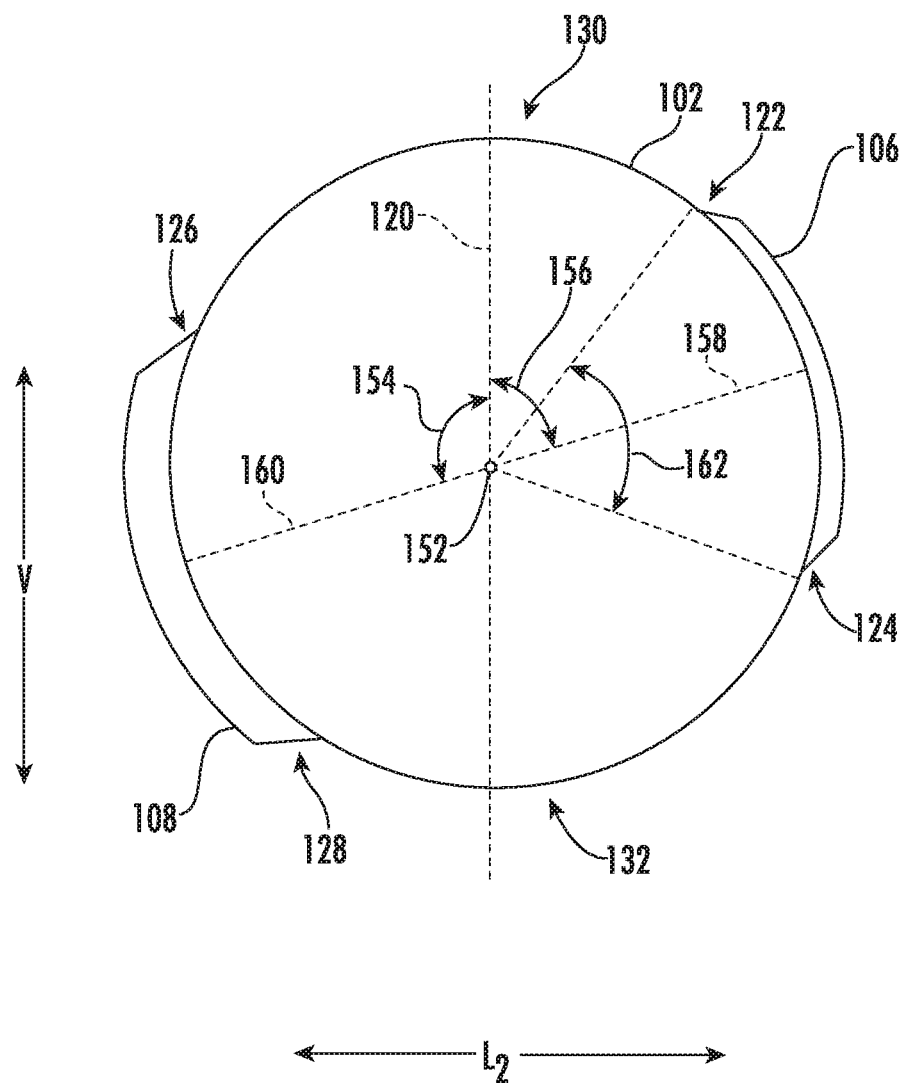
FIG. 11 is a forward-looking-aft, cross-sectional view of the fuselage of the aircraft of FIG. 3.

Such a configuration may also be seen in FIG. 11, providing a forward-looking-aft, cross-sectional view of the fuselage 102 of the aircraft of FIG. 3. As described above, the fuselage 102 includes the first fuselage shield 106 and the second fuselage shield 108. The first fuselage shield 106 includes the top 122 and the bottom 124, and the second fuselage shield 108 includes the top 126 and the bottom 128. As is depicted in FIG. 11, the first fuselage shield 106 assembly defines a first absolute positioning angle 154 relative to a top portion of a vertical reference line extending through the center 152 of the fuselage 102, or more specifically relative to a top portion of the reference plane 120. Similarly, the second fuselage shield 108 assembly defines a second absolute positioning angle 156 relative to the top of the vertical reference line extending through the center 152 of the fuselage 102, or more specifically relative to the top portion of the reference plane 120. As used herein, the term "absolute positioning angle" refers to the absolute value of an angle between two lines. Further, it will be appreciated that the absolute positioning angle of the first fuselage shield 106 is measured from a reference line 158 extending from the center 152 of the fuselage 102 and a center of the first fuselage shield 106 (as measured along a circumference of the fuselage 102), and similarly the absolute positioning angle of the second fuselage shield 108 is measured from a reference line 160 extending from the center 152 of the fuselage 102 and a center of the second fuselage shield 108 (also as measured along a circumference of the fuselage 102).

For the embodiment shown, the difference between the first absolute positioning angle 154 and the second absolute positioning angle 156 is at least five degrees and up to fifty (50_degrees. For example, in certain exemplary embodiments, the difference between the first absolute positioning angle 154 and the second absolute positioning angle 156 may be at least ten degrees, such as at least fifteen (15) degrees, such as up to forty-five (45) degrees, such as up to forty (40) degrees, such as up to thirty-five (35) degrees.

As will be appreciated for the embodiment depicted, the asymmetric positioning of the first fuselage shield 106 and the second fuselage shield 108 may provide for a desired amount of protection for the fuselage 102, without requiring excess fuselage armor, which may lead to an overall heavier aircraft 100, and further may increase an airflow resistance of the aircraft 100.

Moreover, it will be appreciated that the first fuselage shield 106 and second fuselage shield 108 may be sized and/or arranged to provide the desired coverage for the particular gas turbine engine in question. For example, referring still to FIG. 11, will be appreciated that the first fuselage shield 106 defines a coverage span is measured along a circumference of the fuselage 102. More specifically, it will be appreciated that the first fuselage shield 106 defines a coverage span angle 162 between the top 122 and the bottom 124 of the first fuselage shield 106, as measured from the center 152 of the fuselage 102. The coverage span angle 162 for the first fuselage shield 106 is at least forty-five (45) degrees and up to one hundred and eighty (180) degrees. For example, in certain exemplary embodiments, the coverage span angle 162 for the first fuselage shield 106 may be at least about fifty-five (55) degrees and up to about one hundred and twenty (120) degrees. It will be appreciated that the second fuselage shield 108 may define a similar coverage span angle.

In such manner, it will further be appreciated that the fuselage shield 106 may define a surface area sufficient to provide the desired amount of coverage. In at least certain exemplary embodiments, the first fuselage shield 106, the second fuselage shield 108, or both may define a surface area of at least 720 square inches and up to 15,000 square inches. For example, the first fuselage shield 106, the second fuselage shield 108, or both may define a surface area of at least 1000 square inches, such as at least 1200 square inches, such as up to 13,000 square inches, such as up to 10,000 square inches.

As explained above, certain areas of the fuselage 102 may be more susceptible to higher force impacts from debris than others due to, e.g., a proximity to the gas turbine engines, a rotational direction of the rotor blades 16 of the gas turbine engine, etc. In order to further protect from such higher force impacts, without unnecessarily increasing a weight of the fuselage shield 106 and aircraft, in at least certain exemplary embodiments, the fuselage shield 106 may be designed to accommodate different force impacts at various positions along the fuselage shield 106. For example, referring now to FIGS. 12 and 13, in certain exemplary embodiments the fuselage shield 106 may include a plurality of zones arranged along a circumference of the fuselage 102 such that an impact resistance of the fuselage shield 106 varies between each of the adjacent zones along the circumference of the fuselage 102.

Figure 12:
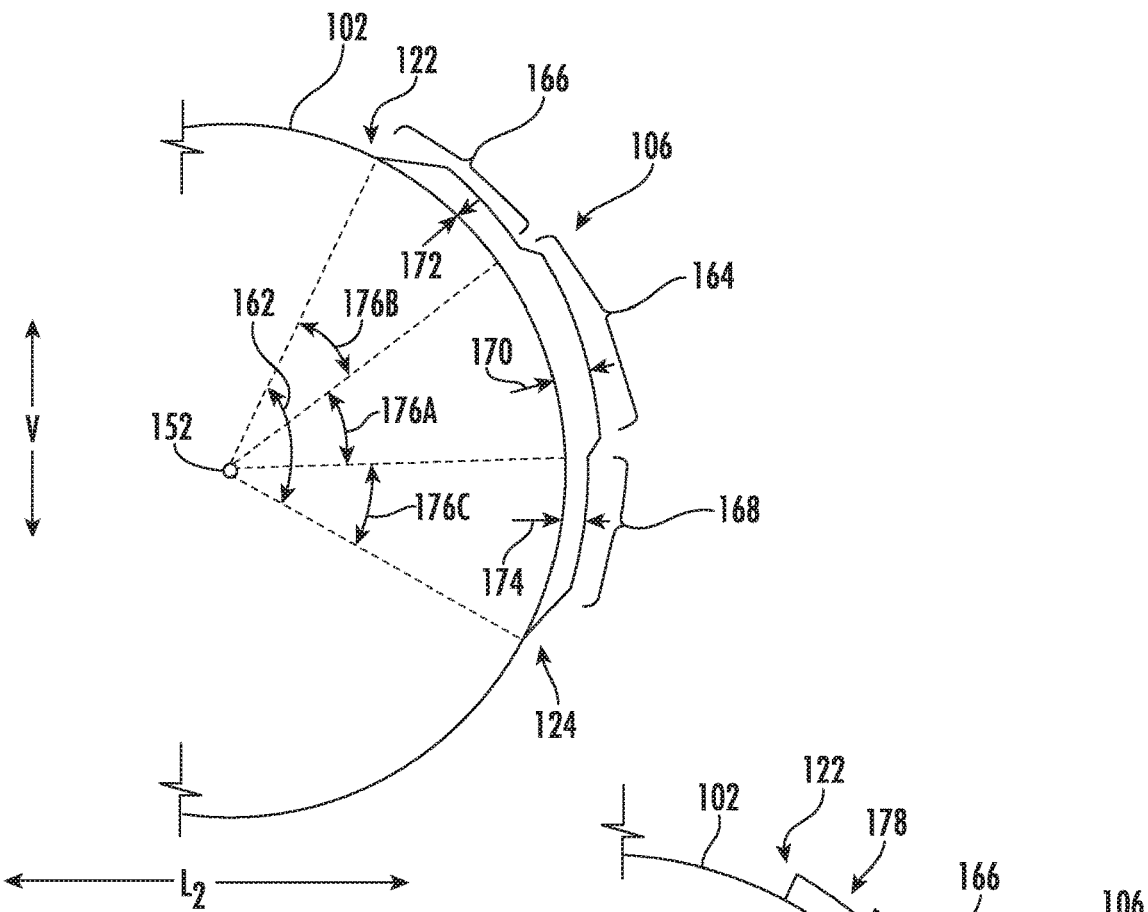
FIG. 12 is a forward-looking-aft, cross-sectional view of a fuselage of an aircraft having a fuselage shield in accordance with an exemplary embodiment of the present disclosure.

Referring particularly to FIG. 12, a forward-looking-aft, cross-sectional view of a fuselage 102 including a fuselage shield 106 in accordance with an exemplary embodiment of the present disclosure is provided. The exemplary fuselage shield 106 depicted may be configured in a similar manner as the exemplary first fuselage shield 106 described above, or may be configured in any other suitable manner.

The exemplary fuselage shield 106 of FIG. 12 includes a first zone 164 having a first impact resistance and a second zone 166 having a second impact resistance, with the first zone 164 and the second zone 166 arrange along the circumference of the fuselage 102. More specifically, for the embodiment of FIG. 12, the fuselage shield 106 further includes a third zone 168 having a third impact resistance. The second zone 166 and the third zone 168 are arranged on opposing sides of the first zone 164 along the circumference of the fuselage 102. The first impact resistance of the first zone 164 of the fuselage shield 106 is greater than the second impact resistance of the second zone 166 and is also greater than the third impact resistance of the third zone 168.

Specifically, for the embodiment shown, the variance in impact resistance is due at least in part to a thickness of the plurality of zones. More specifically, for the embodiment shown, the first zone 164 defines a first thickness 170 that is greater than a second thickness 172 of the second zone 166 and greater than a third thickness 174 of the third zone 168. When the fuselage shield 106 is configured in accordance with one or more the exemplary embodiments above, such as the embodiment of FIG. 4 wherein the fuselage shield 106 includes a plurality of layers, the configuration of FIG. 12 may facilitate an outer layer (e.g., energy distribution layer 116), a middle layer (e.g., energy absorption layer 118), and/or an inner layer (e.g., load spreading layer 114) of the first zone 164 being thicker than the respective layer of the second zone 166 and/or third zone 168.

Notably, for the embodiment of FIG. 12, the different zones of the fuselage shield 106 are formed integrally together as a single fuselage shield 106. However, in other embodiments, the fuselage shield 106 may have still other configurations. Further for the embodiment shown, it will be appreciated that the first zone 164, the second zone 166 and the third zone 168 each define respective span angles 176A, 176B, 176C (measured in the same way the span angle 164 of the first fuselage shield 106 is measured in FIG. 11). The span angles 176A, 176B, 176C are approximately equal to one another in FIG. 12. In other embodiments, however, the span angles 176A, 176B, 176C may vary between the zones 164, 166, 168. For example, in certain exemplary embodiments, each of the zones 164, 166, 168 may define a span angle 176A, 176B, 176C equal to at least 10% of the total span angle 162 of the first fuselage shield 106 and up to 80% of the total span angle 162 of the first fuselage shield 106.

Figure 13:
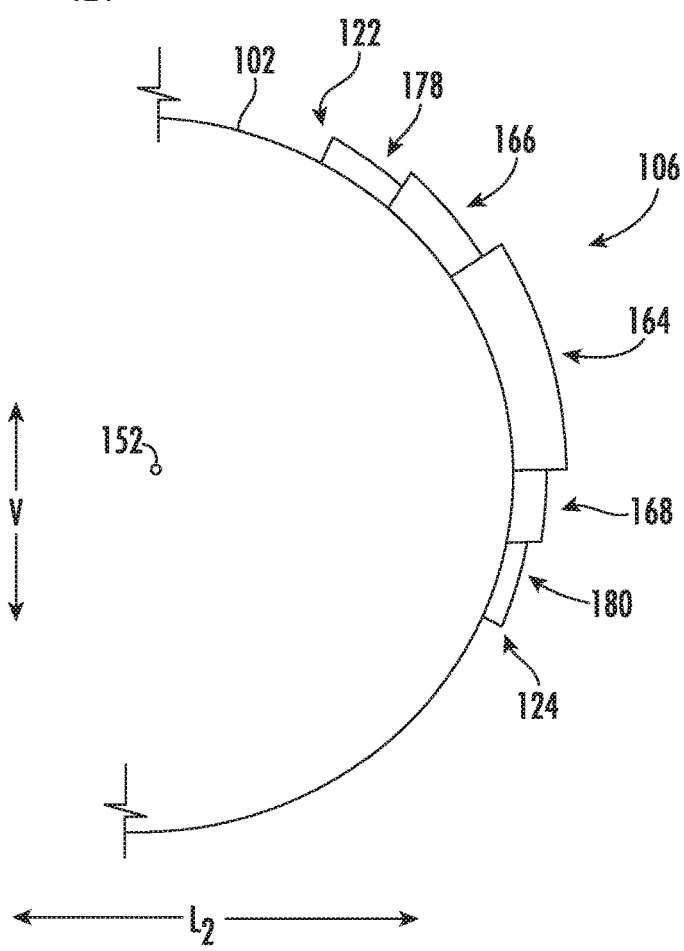
FIG. 13 is a forward-looking-aft, cross-sectional view of a fuselage of an aircraft having a fuselage shield in accordance with another exemplary embodiment of the present disclosure.

For example, referring now to FIG. 13, a forward-looking-aft, cross-sectional view of a fuselage 102 including a fuselage shield 106 in accordance with another exemplary embodiment of the present disclosure is provided. The exemplary fuselage shield 106 FIG. 13 again includes a plurality of zones arrange along a circumference of the fuselage 102 with an impact resistance of the fuselage shield 106 varying between the adjacent zones. In the embodiment shown, the plurality of zones includes at least four zones and up to 10 zones. Specifically, for the embodiment shown, the plurality of zones includes five zones (a first zone 164, a second zone 166, a third zone 168, a fourth zone 178, and a fifth zone 180). Although not labeled, a thickness of the fuselage shield 106 varies between each of the adjacent zones (e.g., adjacent zones 164 and 166, and adjacent zones 166 and 178). For the embodiment of FIG. 13, each of the adjacent zones are configured as separate components which may be individually attached to the fuselage 102, or alternatively, may be attached to one another prior to being attached the fuselage 102.

It will be appreciated that although the differing impact resistances between adjacent zones if the embodiments of FIGS. 12 and 13 is provided at least in part by varying a thickness of the respective adjacent zones, in other embodiments, the differing impact resistances between adjacent zones may be provided in any other suitable manner. For example, in other embodiments the differing impact resistances between adjacent zones may be provided through material choices, layer relative thicknesses, a combination thereof, etc. In such a manner, it will be appreciated that in other exemplary embodiments, the fuselage shield 106 may define a plurality of zones having differing impact resistances between adjacent zones, while maintaining a relatively constant thickness between adjacent zones. Such may be desired for, e.g., aerodynamic reasons, aesthetic reasons, etc.

As will be appreciated, inclusion of a fuselage shield 106 having different zones, with adjacent zones having different impact resistances, may allow for the fuselage shield 106 to be tailored to the coverage desired/required for the specific gas turbine engine, including a position of the gas turbine engine relative to through the fuselage 102, a spacing of the gas turbine engine relative to the fuselage 102, a rotational direction of a rotor assembly 12 of the gas turbine engine, etc. In such a manner, the fuselage shield 106 may not add more weight, air resistance, etc. than necessary to provide the desired/required impact resistance to the fuselage 102.

Further, it will be appreciated that although the exemplary zones described above are arranged along a circumference of the fuselage 102, it will be appreciated that in certain exemplary embodiments, one or more of the zones may also be arranged along the longitudinal direction L1 of the aircraft 100 (e.g., along the length 110 of the fuselage shield 106; see FIG. 3).

Moreover, it will be appreciated that although in certain exemplary embodiments, the exemplary fuselage shields 106 described above may (except as otherwise described) be configured in a similar manner as the exemplary first fuselage shield 106 described above, in other embodiments, the fuselage shield 106 may be configured in any other suitable manner. For example, in certain exemplary embodiments, the fuselage shield 106 may not include three layers, and instead may only include two layers, or alternatively may include any other suitable number of layers (e.g., one, four, five, six or more).

Moreover, as noted above, the first fuselage shield 106 and second fuselage shield 108 may be attached to, or formed integrally with, the fuselage 102. For example, in certain exemplary embodiments, the first fuselage shield 106, the second fuselage shield 108, or both may be welded to the fuselage 102 or otherwise irremovably formed integrally with the fuselage 102.

However, in other exemplary embodiments, it will be appreciated that the first fuselage shield 106, the second fuselage shield 108, or both may be removably coupled to the fuselage 102. For example, referring now to FIG. 14, a plan view of a fuselage shield 106 in accordance with yet another exemplary embodiment of the present disclosure is depicted attached to a fuselage 102. The fuselage shield 106 may be configured in a similar manner as the exemplary first fuselage shield 106 described above, or alternatively may be configured in any other suitable manner.

For the embodiment shown, the fuselage shield 106 is removably coupled to the fuselage 102. As with the embodiments above, the fuselage shield 106 depicted in FIG. 14 may be removably coupled to the fuselage 102 at a location in alignment with a stage of rotor blades of an unducted rotor assembly of the gas turbine engine along a lateral direction of the aircraft.

For the embodiment shown, the fuselage shield 106 is removably coupled to the fuselage 102 using a plurality of mechanical fasteners 138. Additionally, the fuselage shield 106 includes a plurality of openings 136 through which a respective plurality of mechanical fasteners 138 may extend to couple the fuselage shield 106 to the fuselage 102.

More specifically, still, referring briefly to the callout Circle 14, the plurality of openings 136 of the fuselage shield 106 may be configured as a plurality of countersunk screw openings for receiving correspondingly shaped screws, or other mechanical fasteners, that are countersunk into the fuselage shield 106 to reduce or eliminate an aerodynamic drag generated by the mechanical fasteners 138.

It will be appreciated, however, that in other exemplary embodiments, the fuselage shield 106 may be attached to the fuselage 102 in any other suitable manner, using any other suitable mechanical fasteners 138 or other fastening means. For example, in other embodiments, the fuselage shield 106 may be attached entirely the plurality of mechanical fasteners 138, such as one or more countersunk screws, bolts, etc., or through some combination of mechanical fasteners 138, features attached to or formed with the fuselage 102, a glue, an epoxy, or the like.

Figure 14:
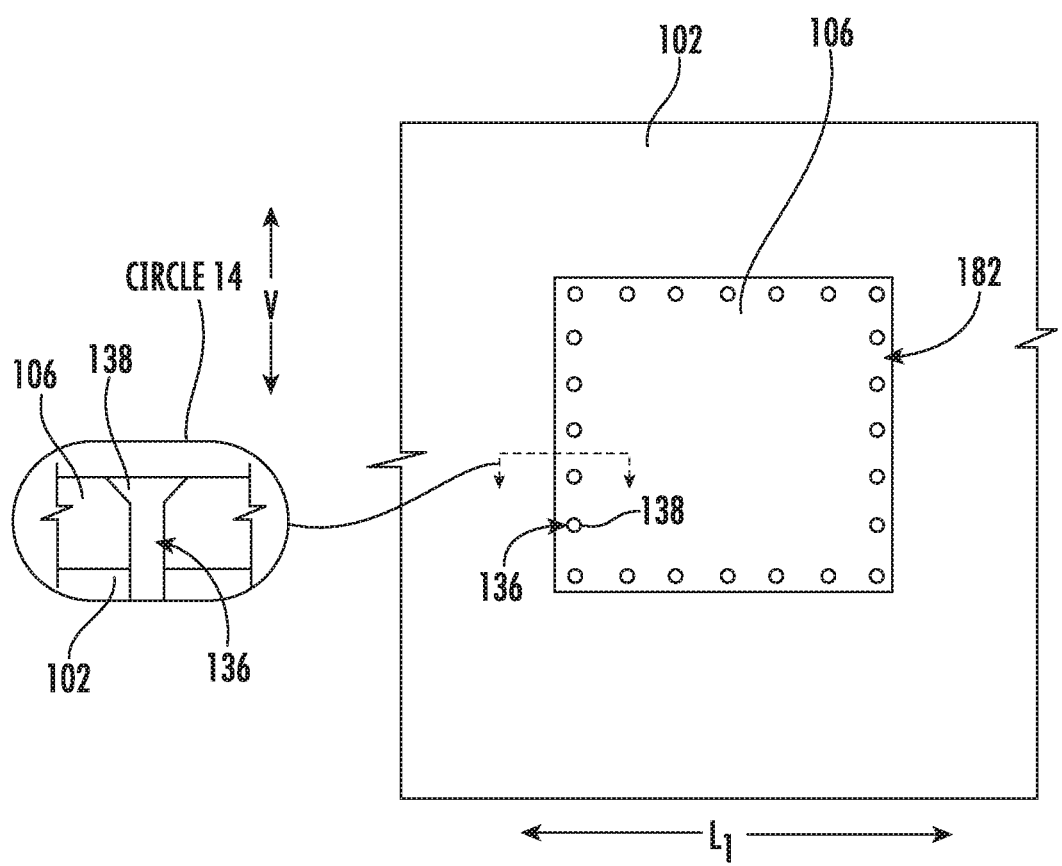
FIG. 14 is a schematic, plan view of a fuselage of an aircraft including a fuselage shield in accordance with the present disclosure.

Referring still to FIG. 14, will be appreciated that the fuselage shield 106 defines a perimeter 182 (an area extending around an outermost edge of the fuselage shield 106, closer to the outermost edge than a center), and the fuselage shield 106 is removably coupled to the fuselage 102 with a plurality fasteners, or rather, the plurality of mechanical fasteners 138, arranged in a density of at least one fastener per inch and up to twenty-five (25) fasteners per inch. Such a configuration may ensure the fuselage shield 106 is coupled to the fuselage 102 in a manner that prevents airflow from passing between the fuselage shield 106 and the fuselage 102, creating excess drag on the aircraft.

Moreover, it will be appreciated that the fuselage shield 106 includes additional features to reduce a drag on the aircraft when the fuselage shield 106 is coupled to the fuselage 102 of the aircraft. For example, referring now to FIG. 15, a cross-sectional view of the exemplary fuselage shield 106 and fuselage 102 of FIG. 14 is depicted. As shown, the fuselage shield 106 extends along the longitudinal direction L1 between a forward end 184 and an aft end 186. The forward end 184 of the fuselage shield 106 defines a forward end taper 188 having a forward end taper angle 190 with the fuselage 102 of at least one (1) degree and up to fifteen (15) degrees. Specifically, for the embodiment shown, the forward end taper angle 190 of the forward end 184 is less than or equal to seven (7) degrees. Similarly, for the embodiment shown, the aft end 186 defines an aft end taper 192 having an aft end taper angle 194 with the fuselage 102 of at least one (1) degree and up to fifteen (15) degrees, such as up to seven (7) degrees. Inclusion of the forward end taper 188 and the aft end taper 192 may reduce an aerodynamic drag on the aircraft by virtue of the inclusion of the fuselage shield 106.

Moreover, for exemplary embodiment depicted, the fuselage shield 106 includes a plurality of layers. Specifically, for the embodiment shown, the fuselage shield 106 includes a first/outer layer (e.g., energy distribution layer 116), a second/middle layer (e.g., energy absorption layer 118), and a third/inner layer (e.g., load spreading layer 114). Further, as noted above, the exemplary fuselage shield 106 is removably coupled to the fuselage 102 using a plurality of mechanical fasteners 138. For the embodiment shown, the fuselage shield 106 is more specifically removably coupled to the fuselage 102 through the first/outer layer using the mechanical fasteners 138. Notably, the mechanical fasteners 138 further extend through the third/inner layer.

In such a manner, it will be appreciated that the outer layer, the middle layer, and the inner layer may be coupled to one another using mechanical fasteners 138. In addition, for the embodiment depicted, the fuselage shield 106 defines a joint 196 between the outer layer and the inner layer. For the embodiment shown, the joint 196 is a weld joint attaching the outer and inner layer to one another, and coupling the fuselage shield 196 together.

However, in other embodiments, the first layer, the middle layer, and a third layer may be coupled to another at least in part using any other suitable means, such as through a mechanical clamp, a resin bondment, a compression wrap, a weld joint, a lamination, or a combination thereof.

Figure 15:
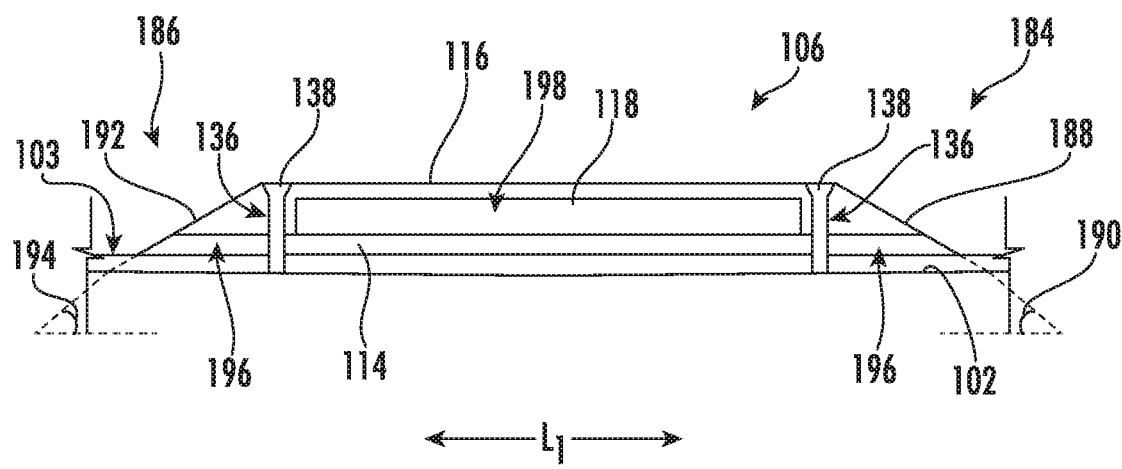
FIG. 15 is a schematic view of the exemplary fuselage shield of FIG. 14.

Referring still to FIG. 15, it will also be appreciated that for the embodiment shown, the middle layer is completely enclosed within an interior 198 of the fuselage shield 106. More specifically, for the embodiment shown, the middle layer is completely enclosed between the outer layer and the inner layer, the interior 198 defined by the outer layer and the inner layer. More specifically, still, for the embodiment shown, the middle layer is hermetically sealed within the interior 198 of the fuselage shield 106, or rather, hermetically seal between the outer layer and the inner layer.

As will be appreciated, having the fuselage shield 106 configured such that the layers are coupled to one another, and further such that a middle layer (e.g., an energy absorption layer 118) is hermetically sealed within an interior of the fuselage shield 106, may further facilitate the fuselage shield 106 being a removable fuselage shield 106. More specifically, one or more of such features may enable the fuselage shield to be installed on an aircraft without requiring additional process steps or integrations with the aircraft to ensure the energy absorption layer 118 is hermetically sealed with respect to an external airflow. For example, such may be desirable when the energy absorption layer 118 defines a relatively low solidity percentage, such that if not hermetically sealed, airflow may flow thereto causing additional drag on the aircraft.

It will be appreciated, however, that in other exemplary embodiments, the fuselage shield 106 may be configured in any other suitable manner, and attached to the fuselage 102 in any other suitable manner. For example, the fuselage shield 106 may not be removably coupled to the fuselage 102 of the aircraft 100, and instead may be permanently coupled to the fuselage 102. For example, the fuselage shield 106 may be welded, epoxied, brazed, etc. to the fuselage 102.

Further aspects of the invention are provided by the subject matter of the following clauses:

An aircraft defining a longitudinal direction and a lateral direction, the aircraft comprising: a fuselage; a single unducted rotor engine mounted at a location spaced from the fuselage of the aircraft, the single unducted rotor engine comprising an unducted rotor assembly having a single stage of rotor blades; and a fuselage shield attached to or formed integrally with the fuselage at a location in alignment with the single stage of rotor blades of the unducted rotor assembly along the lateral direction.

The aircraft of one or more of these clauses, further comprising: a wing extending from the fuselage generally along the lateral direction, wherein the single unducted rotor engine is mounted to the wing.

The aircraft of one or more of these clauses, wherein the single unducted rotor engine is a first single unducted rotor engine, wherein the fuselage shield is a first fuselage shield attached to or formed integrally with a first side of the fuselage, and wherein the aircraft further comprises: a second single unducted rotor engine comprising an unducted rotor assembly having a single stage of rotor blades; a first wing extending from the first side of the fuselage generally along the lateral direction, wherein the first single unducted rotor engine is mounted to the first wing; a second wing extending from a second side of the fuselage generally along the lateral direction, wherein the second single unducted rotor engine is mounted to the second wing; and a second fuselage shield attached to or formed integrally with the second side of the fuselage at a second location in alignment with the single stage of rotor blades of the second unducted rotor assembly along the lateral direction.

The aircraft of one or more of these clauses, wherein the first fuselage shield is positioned asymmetrically to the second fuselage shield relative to a reference plane extending along the longitudinal direction and a vertical direction through a center of the aircraft.

The aircraft of one or more of these clauses, wherein the rotor assembly of the first single unducted rotor engine and the rotor assembly of the second single unducted rotor engine each rotate in the same rotational direction, and wherein the first fuselage shield extends higher than the second fuselage shield along the vertical direction or lower than the second fuselage shield along the vertical direction.

The aircraft of one or more of these clauses, wherein the first fuselage shield defines a first absolute positioning angle relative to a top of a vertical reference line extending through a center of the fuselage, wherein the second fuselage shield defines a second absolute positioning angle relative to the top of the vertical reference line, wherein a difference between the first absolute positioning angle and the second absolute positioning angle is greater than 5 degrees and less than fifty degrees.

The aircraft of one or more of these clauses, wherein the fuselage shield defines a top end and a bottom end along a vertical direction of the aircraft, wherein the fuselage shield defines a coverage span angle between the top end and the bottom end as measured from a center of the fuselage of at least 45 degrees and up to about 180 degrees.

The aircraft of one or more of these clauses, wherein the fuselage shield comprises a first zone having a first impact resistance and a second zone having a second impact resistance, wherein the first zone and second zone are arranged along a circumference of the fuselage.

The aircraft of one or more of these clauses, wherein the fuselage shield further comprises a third zone having a third impact resistance, wherein the second zone and third zone are arranged on opposing sides of the first zone along the circumference of the fuselage, and wherein the first impact resistance is greater than the second impact resistance and greater than the third impact resistance.

The aircraft of one or more of these clauses, wherein the fuselage shield comprises a plurality of zones arranged along a circumference of the fuselage, wherein an impact resistance of the fuselage shield varies between each of the adjacent zones.

The aircraft of one or more of these clauses, wherein a thickness of the fuselage shield varies between each of the adjacent zones.

The aircraft of one or more of these clauses, wherein the plurality of zones includes at least 4 zones and up to 10 zones.

The aircraft of one or more of these clauses, wherein the fuselage shield defines a surface area between 720 square inches and 15,000 square inches.

A fuselage shield assembly for use with a fuselage of an aircraft having a single unducted rotor engine, the aircraft defining a longitudinal direction and a lateral direction, the fuselage shield assembly comprising: a body configured to be attached to or formed integrally with the fuselage of the aircraft at a location in alignment with the single unducted rotor engine along the lateral direction, body comprising a plurality of zones configured to be arranged along a circumference of the fuselage when coupled to the fuselage of the aircraft, wherein an impact resistance of the fuselage shield varies between each of the adjacent zones.

The fuselage shield assembly of one or more of these clauses, wherein the plurality of zones includes a first zone having a first impact resistance and a second zone having a second impact resistance, wherein the first zone and second zone are configured to be arranged along a circumference of the fuselage.

The fuselage shield assembly of one or more of these clauses, wherein the fuselage shield further comprises a third zone having a third impact resistance, wherein the second zone and third zone are arranged on opposing sides of the first zone, and wherein the first impact resistance is greater than the second impact resistance and greater than the third impact resistance.

The fuselage shield assembly of one or more of these clauses, wherein a thickness of the fuselage shield varies between each of the adjacent zones.

The fuselage shield assembly of one or more of these clauses, wherein the plurality of zones includes at least 4 zones and up to 10 zones.

The fuselage shield assembly of one or more of these clauses, wherein the fuselage shield defines a surface area between 720 square inches and 15,000 square inches.

The fuselage shield assembly of one or more of these clauses, wherein the body of the fuselage shield assembly defines a top end and a bottom end along a vertical direction of the aircraft when coupled to the fuselage of the aircraft, wherein the body defines a coverage span angle between the top end and the bottom end as measured from a center of the fuselage of at least 45 degrees and up to about 180 degrees when coupled to the fuselage of the aircraft.

An aircraft defining a longitudinal direction and a lateral direction, the aircraft comprising: a fuselage; an unducted rotor engine mounted at a location spaced from the fuselage of the aircraft, the unducted rotor engine comprising an unducted rotor assembly having a stage of unducted rotor blades; and a fuselage shield removably coupled to the fuselage at a location in alignment with the stage of rotor blades of the unducted rotor assembly along the lateral direction.

The aircraft of one or more of these clauses, wherein the fuselage shield is removably coupled to the fuselage using a plurality of mechanical fasteners.

The aircraft of one or more of these clauses, wherein the fuselage shield defines a perimeter, and wherein the fuselage shield is removably coupled to the fuselage with a plurality of fasteners arranged in a density of at least one fastener per inch and up to 25 fasteners per inch.

The aircraft of one or more of these clauses, wherein the fuselage shield defines a forward end and an aft end, wherein the forward end defines a forward end taper angle of at least 1 degree and up to 15 degrees.

The aircraft of one or more of these clauses, wherein the forward end taper angle of the forward end is less than or equal to 7 degrees.

The aircraft of one or more of these clauses, wherein the aft end defines an aft end taper angle of at least 1 degree and up to 15 degrees.

The aircraft of one or more of these clauses, wherein the fuselage shield comprises a first layer and a second layer.

The aircraft of one or more of these clauses, wherein the second layer is hermetically sealed within an interior of the fuselage shield.

The aircraft of one or more of these clauses, wherein the fuselage shield is removably coupled to the fuselage through the first layer.

The aircraft of one or more of these clauses, wherein the first layer is an energy distribution layer, wherein the second layer is an energy absorption layer.

The aircraft of one or more of these clauses, wherein the unducted rotor engine is a single unducted rotor engine, and wherein the unducted rotor assembly and the stage of unducted rotor blades are a single unducted rotor assembly and a single stage of unducted rotor blades, respectively.

The aircraft of one or more of these clauses, wherein the fuselage shield defines a surface area between 720 square inches and 15,000 square inches.

The aircraft of one or more of these clauses, wherein the fuselage shield assembly defines a top end and a bottom end along a vertical direction of the aircraft, wherein the fuselage shield defines a coverage span angle between the top end and the bottom end as measured from a center of the fuselage of at least 45 degrees and up to about 180 degrees.

An aircraft defining a longitudinal direction and a lateral direction, the aircraft comprising: a fuselage; an unducted rotor engine mounted at a location spaced from the fuselage of the aircraft, the unducted rotor engine comprising an unducted rotor assembly having a stage of unducted rotor blades; and a fuselage shield attached to or formed integrally with the fuselage at a location in alignment with the single stage of rotor blades of the unducted rotor assembly along the lateral direction, the fuselage shield comprising a first layer defining a first density and a second layer defining a second density, the first density being different than the second density.

The aircraft of one or more of these clauses, wherein a thickness of the first layer is different than a thickness of the second layer.

The aircraft of one or more of these clauses, wherein the first layer is an energy distribution layer, and wherein the second layer is an energy absorption layer.

The aircraft of one or more of these clauses, wherein the thickness of the first layer is at least 0.05 inches and up to 2.5 inches, and wherein the thickness of the second layer is at least 0.25 inches and up to 4 inches.

The aircraft of one or more of these clauses, further comprising a third layer, wherein the third layer is a load spreading layer, and wherein a thickness of the third layer is at least 0.05 inches and up to 2.5 inches.

The aircraft of one or more of these clauses, wherein the first layer is formed of a Kevlar, a metal, a carbon fiber composite, a ceramic, or a combination thereof, and wherein the second layer comprises a honeycomb structure, a lattice structure, a foam material, a polyurethane material, or a combination thereof.

The aircraft of one or more of these clauses, wherein the first density is greater than the second density.

The aircraft of one or more of these clauses, wherein the first density is at least about 100% greater than the second density.

The aircraft of one or more of these clauses, wherein the energy distribution layer is positioned closer to the stage of unducted rotor blades than the energy absorption layer.

The aircraft of one or more of these clauses, wherein the fuselage shield further comprises a load spreading layer defining a third density, wherein the third density is greater than the first density.

The aircraft of one or more of these clauses, wherein the energy distribution layer is positioned closer to the stage of unducted rotor blades than the energy absorption layer, and wherein the energy absorption layer is positioned closer to the stage of unducted rotor blades than the load spreading layer.

The aircraft of one or more of these clauses, wherein the second layer is hermetically sealed within an interior of the fuselage shield.

The aircraft of one or more of these clauses, wherein the fuselage shield is coupled to the fuselage through the first layer.

The aircraft of one or more of these clauses, wherein the first layer and the second layer are secured to one another at least in part using a mechanical clamp, a resin bondment, a compression wrap, a weld joint, a lamination, or a combination thereof.

The aircraft of one or more of these clauses, wherein the first layer is an energy distribution layer, wherein the second layer is an energy absorption layer, and wherein the second layer is formed of a plurality of sheets and plurality of spacers positioned between adjacent sheets of the plurality of sheets.

A fuselage shield assembly for use with a fuselage of an aircraft having an unducted rotor engine, the aircraft defining a longitudinal direction and a lateral direction, the fuselage shield assembly comprising: a body formed of a plurality of layers configured to be attached to or formed integrally with the fuselage of the aircraft at a location in alignment with the unducted rotor engine along the lateral direction, the plurality of layers comprising a first layer and a second layer, the first layer defining a first density and the second layer defining a second density, the first density being different than the second density.

The fuselage shield assembly of one or more of these clauses, wherein the first layer is an energy distribution layer, wherein the second layer is an energy absorption layer, and wherein the first density is greater than the second density.

The fuselage shield assembly of one or more of these clauses, wherein the first density is at least about 100% greater than the second density.

The fuselage shield assembly of one or more of these clauses, wherein the energy distribution layer is configured to be positioned closer to the unducted rotor engine than the energy absorption layer.

The fuselage shield assembly of one or more of these clauses, wherein the fuselage shield further comprises a load spreading layer defining a third density, wherein the third density is greater than the first density, wherein the energy distribution layer is configured to be positioned closer to the unducted rotor engine than the energy absorption layer, and wherein the energy absorption layer is configured to be positioned closer to the unducted rotor engine than the load spreading layer.

An aircraft defining a longitudinal direction and a lateral direction, the aircraft comprising: a fuselage; an engine mounted at a location spaced from the fuselage of the aircraft, the engine comprising rotor blades; and at least one fuselage shield removably coupled to the fuselage at a location in alignment with the rotor blades along the lateral direction.

The aircraft of one or more of these clauses, wherein the aircraft is a narrow body aircraft or a wide body aircraft.

The aircraft of one or more of these clauses, wherein the fuselage of the aircraft defines a width along a lateral direction of at least 80 inches, such as at least 90 inches, such as at least 100 inches, such as at least 110 inches, such as at least 130 inches.

The aircraft of one or more of these clauses, wherein the fuselage of the aircraft defines a width along a lateral direction of up to 400 inches, or up to 350 inches, or up to 300 inches.

The aircraft of one or more of these clauses, wherein the plurality of rotor blades defines a diameter of at least six feet, such as at least eight feet, such as at least ten feet, such as at least twelve feet.

The aircraft of one or more of these clauses, wherein the plurality of rotor blades defines a diameter of up to 22 feet.

The aircraft of one or more of these clauses configured to carry more than 100 passengers.

The aircraft of one or more of these clauses configured to carry more than 150 passengers.

The aircraft of one or more of these clauses configured to carry less than 600 passengers.

The aircraft of one or more of these clauses having a cruise speed between Mach 0.5 and Mach 0.85.

The aircraft of one or more of these clauses having a cruise speed between Mach 0.75 and Mach 0.85.

The aircraft of one or more of these clauses having a cruise altitude between 28,000 feet and 65,000 feet.

The aircraft of one or more of these clauses having a cruise altitude between 28,000 feet and 45,000 feet.

The aircraft of one or more of these clauses having a cruise altitude approximately 4.85 psia and approximately 0.82 psia based on a sea level pressure of approximately 14.70 psia and sea level temperature at approximately 59 degree Fahrenheit.

The aircraft of one or more of these clauses having a cruise altitude approximately 4.85 psia and approximately 2.14 psia based on a sea level pressure of approximately 14.70 psia and sea level temperature at approximately 59 degree Fahrenheit.

An aircraft of one or more of these clauses incorporating a fuselage shield assembly of one or more of these clauses.

A fuselage shield assembly of one or more of these clauses incorporated into an aircraft of one or more of these clauses.

What is claimed is:

1. An aircraft defining a longitudinal direction and a lateral direction, the aircraft comprising:
   a fuselage;
   an engine mounted at a location spaced from the fuselage of the aircraft, the engine comprising a plurality of rotor blades; and
   a fuselage shield attached to or formed integrally with the fuselage at a location in alignment with the plurality of rotor blades along the lateral direction, the fuselage shield comprising a first layer defining a first density and a second layer defining a second density, the first density being different than the second density.

2. The aircraft of claim 1, wherein a thickness of the first layer is different than a thickness of the second layer.

3. The aircraft of claim 1, wherein the first layer is an energy distribution layer, and wherein the second layer is an energy absorption layer.

4. The aircraft of claim 3, wherein the thickness of the first layer is at least 0.05 inches and up to 2.5 inches, and wherein the thickness of the second layer is at least 0.25 inches and up to 4 inches.

5. The aircraft of claim 4, further comprising a third layer, wherein the third layer is a load spreading layer, and wherein a thickness of the third layer is at least 0.05 inches and up to 2.5 inches.

6. The aircraft of claim 3, wherein the first layer is formed of a Kevlar, a metal, a carbon fiber composite, a ceramic, or a combination thereof, and wherein the second layer comprises a honeycomb structure, a lattice structure, a foam material, a polyurethane material, or a combination thereof.

7. The aircraft of claim 3, wherein the first density is greater than the second density.

8. The aircraft of claim 3, wherein the first density is at least about 100% greater than the second density.

9. The aircraft of claim 3, wherein the energy distribution layer is positioned closer to the plurality of rotor blades than the energy absorption layer.

10. The aircraft of claim 3, wherein the fuselage shield further comprises a load spreading layer defining a third density, wherein the third density is greater than the first density.

11. The aircraft of claim 10, wherein the energy distribution layer is positioned closer to the plurality of rotor blades than the energy absorption layer, and wherein the energy absorption layer is positioned closer to the plurality of rotor blades than the load spreading layer.

12. The aircraft of claim 1, wherein the second layer is hermetically sealed within an interior of the fuselage shield.

13. The aircraft of claim 12, wherein the fuselage shield is coupled to the fuselage through the first layer.

14. The aircraft of claim 1, wherein the first layer and the second layer are secured to one another at least in part using a mechanical clamp, a resin bondment, a compression wrap, a weld joint, a lamination, or a combination thereof.

15. The aircraft of claim 1, wherein the first layer is an energy distribution layer, wherein the second layer is an energy absorption layer, and wherein the second layer is formed of a plurality of sheets and plurality of spacers positioned between adjacent sheets of the plurality of sheets.

16. The aircraft of claim 1, wherein the aircraft is a narrow body or wide body commercial passenger aircraft.

17. A fuselage shield assembly for use with a fuselage of an aircraft having an unducted rotor engine, the aircraft defining a longitudinal direction and a lateral direction, the fuselage shield assembly comprising:
a body formed of a plurality of layers configured to be attached to or formed integrally with the fuselage of the aircraft at a location in alignment with the unducted rotor engine along the lateral direction, the plurality of layers comprising a first layer and a second layer, the first layer defining a first density and the second layer defining a second density, the first density being different than the second density.

18. The fuselage shield assembly of claim 17, wherein the first layer is an energy distribution layer, wherein the second layer is an energy absorption layer, and wherein the first density is greater than the second density.

19. The fuselage shield assembly of claim 18, wherein the first density is at least about 100% greater than the second density.

20. The fuselage shield assembly of claim 18, wherein the energy distribution layer is configured to be positioned closer to the unducted rotor engine than the energy absorption layer.

21. The fuselage shield assembly of claim 18, wherein the fuselage shield further comprises a load spreading layer defining a third density, wherein the third density is greater than the first density, wherein the energy distribution layer is configured to be positioned closer to the unducted rotor engine than the energy absorption layer, and wherein the energy absorption layer is configured to be positioned closer to the unducted rotor engine than the load spreading layer.

* * * * *